US006886453B2

(12) United States Patent
Yamamoto et al.

(10) Patent No.: US 6,886,453 B2
(45) Date of Patent: May 3, 2005

(54) RICE POLISHER, PRE-POLISHED RICE PRODUCING APPARATUS, LEVELING DEVICE AND PRE-POLISHED RICE PRODUCING FACILITY

(75) Inventors: Soichi Yamamoto, Tendo (JP); Masashi Shibata, Kasukabe (JP); Yoichi Adachi, Tendo (JP); Harou Mori, Oishida-machi (JP); Yuji Suzuki, Tendo (JP)

(73) Assignee: Kabushiki Kaisha Yamamoto Seisakusho, Yamagata-ken (JP)

( * ) Notice: Subject to any disclaimer, the term of this patent is extended or adjusted under 35 U.S.C. 154(b) by 213 days.

(21) Appl. No.: 10/349,415

(22) Filed: Jan. 22, 2003

(65) Prior Publication Data

US 2003/0110958 A1 Jun. 19, 2003

Related U.S. Application Data

(63) Continuation of application No. 09/880,951, filed on Mar. 7, 2001, now Pat. No. 6,539,849.

(51) Int. Cl.[7] ............................ A23L 1/00; B02B 3/00; B02B 3/04; B02B 3/06

(52) U.S. Cl. ............................ 99/519; 99/524; 99/600; 99/606; 99/611; 99/613

(58) Field of Search .......................... 99/516, 519–531, 99/617–622, 600–612; 241/86.1, 88.2, 93; 426/481–483

(56) References Cited

U.S. PATENT DOCUMENTS

| | | | | |
|---|---|---|---|---|
| 4,913,045 A | | 4/1990 | Satake | 99/519 |
| 5,033,371 A | | 7/1991 | Satake et al. | 99/519 |
| 5,048,407 A | | 9/1991 | Salete-Garces | 99/519 |
| 5,119,721 A | | 6/1992 | Satake et al. | 99/519 |
| 5,259,303 A | | 11/1993 | Yamamoto et al. | 99/519 |
| 6,539,849 B2 | * | 4/2003 | Yamamoto et al. | 99/519 |

FOREIGN PATENT DOCUMENTS

| | | |
|---|---|---|
| JP | 2-14649 | 6/1949 |
| JP | 54-46880 | 9/1977 |

(Continued)

OTHER PUBLICATIONS

Notice of Reasons for Rejection of Japanese Patent Application No. 2000–203919, Nov. 21, 2002.

Notice of Reasons for Rejection of Japanese Patent Application No. 2000–227441, Nov. 20, 2002.

*Primary Examiner*—Timothy F. Simone

(74) *Attorney, Agent, or Firm*—Marshall, Gerstein & Borun LLP

(57) ABSTRACT

A rice polisher for polishing rice, which is a preprocess necessary for producing pre-white rice having a favorable taste by using a small amount of water, a pre-polished rice producing apparatus that uses the rice polisher, a leveling device capable of uniformly leveling grains, and a pre-polished rice producing facility. The rice polisher includes a grain-lifting spiral for transporting white rice above from below, a water-pouring port for pouring polishing water, the water-pouring port being disposed at a head portion, a discharge port for discharging the white rice, the discharge port being disposed at the head portion, and a rice-polishing roll for polishing rice by agitating together with the polishing water poured from the water-pouring port the white rice pressurized by transportation by the grain-lifting spiral, with the polisher discharging from the discharge port the white rice that has been polished.

2 Claims, 10 Drawing Sheets

FOREIGN PATENT DOCUMENTS

| | | |
|---|---|---|
| JP | 26-12243 | 5/1986 |
| JP | 01-297151 | 11/1989 |
| JP | 02-261553 | 10/1990 |
| JP | 03-010646 | 1/1991 |
| JP | 64-18449 | 1/1991 |
| JP | 03-254649 | 11/1991 |
| JP | 04-203884 | 7/1992 |
| JP | 07-030676 | 1/1995 |
| JP | 08-024676 | 1/1996 |
| JP | 10-216539 | 8/1998 |
| JP | 11-042056 | 2/1999 |
| JP | 11-253357 | 2/2000 |
| JP | 11-139852 | 5/2000 |
| JP | 11-298276 | 5/2000 |
| JP | 11-301100 | 5/2000 |

* cited by examiner

RICE POLISHER, PRE-POLISHED RICE PRODUCING APPARATUS, LEVELING DEVICE AND PRE-POLISHED RICE PRODUCING FACILITY

This is a continuation of Ser. No. 09/860,951 filed Mar. 7, 2001 now U.S. Pat. No. 6,539,849.

BACKGROUND OF THE INVENTION

1. Field of the Invention

The present invention relates to a rice polisher (rice polishing section or rice washing section) for conducting preprocessing to produce so-called "pre-polished rice" (pre-polished processed rice, dried washed rice, or processed rice) and with which it is possible to readily cook rice by only adding water, without the need to wash rice (i.e., to polish rice) before cooking the rice, and that has good preservability. The present invention further relates to pre-polished rice producing apparatus (pre-polished rice processing apparatus) a pre-polished rice producing facility comprising the rice polisher, and to a leveling device for leveling grains supplied on a receiving surface of a receiving member.

2. Description of the Related Art

When white rice (polished rice, raw material rice or raw material white rice) is washed in water by an ordinary method, water permeates the polished rice and the water content of the rice increases, whereby the rice becomes subject to mold growth or decomposition. Thus, pre-polished rice that can be handled in the same manner as ordinary polished rice cannot be obtained. Alternatively, when polished rice whose water content has been increased due to being polished in water is dried, the starch layer of the polished rice that has absorbed water and expanded shrinks upon being dried (see, for instance, Japanese Patent Application Publication (JP-B) No. 3-36496). Thus, when the polished white rice is dried, the surface of the starch layer of the polished white rice abruptly shrinks, whereby tension is created in the surface layer and the rice cracks. Polished rice that has sustained cracking absorbs a high volume of water during cooking, whereby the rice expands unevenly and a high volume of starch particle is released from the crack. It is well known that this results in rice having inferior taste.

JP-B No. 7-106321 discloses a pre-polished rice producing apparatus comprising a transversal rice polishing section including an agitating cylinder and an agitating roll for receiving polishing water (may also be called cleansing (polishing or washing) water or rice polishing (washing) water) for cleaning (washing or polishing) rice, and a rinsing-dehydrating section for dehydrating the rice polished (washed) while rinsing the rice in rinsing water supplied thereto.

However, according to this pre-polished rice producing apparatus, there is a problem in that a large amount of water must be used because water is needed for both the cleaning step and the rinsing step. Use of a large amount of water not only results in swelling water bills, but also means that a large amount of polluted water (polished-waste water, washed-waste water, discharge water or drain water) is discharged, whereby companies are obliged to use large and expensive water-purifying plants as stipulated by bylaws for the prevention of environmental pollution. Thus, this has become a big concern in the rice industry.

Japanese Patent Application Laid-Open (JP-A) No. 11-42056 discloses a pre-polished rice producing apparatus comprising a rice-hulling (milling) apparatus of an upright type, in which polished rice with washing water is moved downward by a supply screw and then moved back upward by a reverse screw, during which the rice undergoes an agitation and hulling (milling) process, and the processed rice is discharged from a lower portion.

However, according to this pre-polished rice producing apparatus, the polishing water is flown downwardly and the rice is moved downwardly in the same direction as the water flow, and the polished rice is discharged from the lower portion. Thus, although water is clear in a first step (upper portion) of the rice polishing, the water becomes dirty in a last finishing step (lower portion) of the polishing process. Therefore, even if the next dehydrating process provides an efficient dehydration, aleurone residue (waste water) will stay on the rice, posing a problem of deteriorated taste.

In another pre-polished rice producing apparatus (a wet type pre-polished rice producing apparatus), a rice polishing section is provided. Raw material rice (polished rice) supplied is agitated with polishing water in the rice polishing section, separating from the surface of the raw material rice such impurities as aleurone residue (i.e., liquid-like, extremely sticky mixture containing oil, protein and sugar included in the aleurone layer (layer of aleurone) which is the lowest layer of rice bran layers of brown rice). The separated matter is solved in the polishing water. Further, this pre-polished rice producing apparatus is provided with a dehydrating section. The raw material rice that has undergone the polishing process is supplied to the dehydrating section for dehydration.

Further, this pre-polished rice producing apparatus comprises a drying section. The drying section is provided with a drying disc. The raw material rice that has undergone the dehydrating process is supplied onto the drying disc, and a warm wind is supplied to the raw material rice to thereby dry the raw material rice.

With the above described processes, the pre-polished rice producing apparatus processes the raw material rice in the rice-polishing process, thereby producing a processed rice (the raw material rice dried at the drying section).

It should be noted here that, in general, water content increase in the pre-polished rice with respect to water content in the raw material rice (typically from 14 weight percent to 15 weight percent) should preferably be within plus 0.5 weight percent. Further, the water content of the polished rice should preferably be the same as in the raw material rice, i.e., in the range from 14 weight percent to 15 weight percent.

The reason for this is that a water content increase of plus 0.5 weight percent or greater in the pre-polished rice over the water content in the raw material rice is a result of excessive permeation of dirty polishing water (hereinafter called "waste water" (same as discharge water or drain water)) containing the aleurone residue at the time of rice polishing in the rice polishing section. The pre-polished rice permeated by such a large amount of the waste water does not taste good.

Further, if the water content in the pre-polished rice is less than 14 weight percent, the polished rice becomes subject to cracking on its surface, whereby the polished rice absorbs a high volume of water during cooking, resulting in uneven expansion or release of a high volume of starch particles from the crack. Such a cooking process described as above will make the cooked rice extremely low in quality and poor in taste.

On the other hand, if the water content in the polished rice is greater than 15 weight percent, the rice becomes subject to mold growth or decomposition, becoming poor in preservability.

However, according to the pre-polished rice producing apparatus as described above, an extent of the drying at the drying section fluctuates depending on the temperature and moisture of an atmosphere in the drying section, and amount of flow of the polished rice. Therefore, it is difficult to adjust the water content of the pre-polished rice.

It should further be noted here that in general, it is possible to improve quality of the wash-processed rice by controlling the water content difference between the wash-processed rice and a raw material rice within ±0.2 weight percent. In order to achieve this, according to the above described pre-polished rice producing apparatus, a human operator manually samples the raw material rice before the ready-to-cook processing and the processed rice after the ready-to-cook processing, and measures the water content in both. Based on the results of the measurements, the human operator manually changes the amount of supply of the raw material rice to the rice polishing section, the temperature of the warm wind supplied to the drying section, the amount of the warm wind to be supplied, and rotating speed of the drying disc, in order to adjust the water content in the processed rice.

However, according to the pre-polished rice producing apparatus, it is difficult to constantly produce the processed rice of a high quality, because the human operator will only measure the water content in the manually sampled processed rice and the raw material rice before the ready-to-cook processing as has been described above.

Further, the operator has to measure the water content in the raw material rice and the processed rice, and in addition, to constantly monitor operating status of the pre-polished rice producing apparatus for the adjustment of the water content in the processed rice. This poses a problem that the operator's task is complex.

Still further, according to a pre-polished rice producing apparatus such as the one described above, the rice polishing section and the dehydrating section in particular are fixed to a frame of the apparatus. Therefore, when performing a maintenance operation such as cleaning or polishing of the rice polishing section and the dehydrating section, a major dismantling and rebuilding procedures must be performed to most of the rice polishing section and the dehydrating section (or the entire portion thereof depending on the structure of the rice polishing section and the dehydrating section). Further, the dismantling and the rebuilding processes of the rice polishing section and the dehydrating section require a multiplicity of disassembling and reassembling steps which must be followed truthfully in a given order. This means that a huge amount of time and labor must be spent for the maintenance of the rice polishing section and the dehydrating section, making difficult the maintenance of the pre-polished rice producing apparatus.

Further, in order to properly perform the maintenance of the rice polishing section and the dehydrating section (including disassembling and reassembling of each component in the rice polishing section and the dehydrating section), the rice polishing section and the dehydrating section must have a size large enough to allow access. This creates another problem that the pre-polished rice producing apparatus tends to be unnecessarily large.

In general, in food processing machinery that uses water, it is absolutely necessary to clean the machine every time the operation is finished. The same principle applies to a pre-polished rice producing apparatus, and it is specifically necessary to clean inside of the rice polishing section including removal of residual rice (raw material white rice) at each end of the operation. In order to do such an internal cleaning of the rice polishing section as the above, the rice polishing section must usually be disassembled for the cleaning, and then reassembled. Otherwise, if the rice polishing section incorporates a shutter for example which can open and close the inside of the rice polishing section, the inside of the rice polishing section must be opened by the shutter for the cleaning, making the cleaning more complex. For these reasons, there is a desire for automated cleaning of the inside of the rice polishing section.

Further, a development is underway, in which a drying section has a drying disc above which a predetermined number of leveling plates are provided. According to a pre-polished rice producing apparatus as this, by leveling the polished rice on the drying disc by the leveling plates, it becomes possible to prevent uneven drying of the polished rice.

However, the amount of supply of the polished rice to the rice polishing section and the mount of dried polished rice at the drying section (the amount of discharge of the polished rice from the dehydrating section) can change from time to time depending on the cultivator and characteristics (such as grain size, ratio of chipped or cracked rice inclusion and so on) of the polished rice.

Under such a situation as above, if the amount of the dried polished rice at the drying section is too large, the polished rice overflows from the leveling plates. On the other hand, if the mount of the dried polished rice at the drying section is too small, the polished rice leveled by the leveling plates is not flat but has recesses. In any of the cases, the polished rice on the net cannot be leveled by the leveling plates, leading to uneven drying of the polished rice, potentially resulting in deterioration in the quality of the polished rice.

Further, if the polished rice supplied onto the drying disc in the drying section is not leveled uniformly over its entire surface to a uniform thickness, result is uneven drying of the polished rice as well as decreased drying efficiency. This leads to a problem of inability to obtain the pre-polished rice of a uniform quality in which there is no excessive fluctuation in the water content.

Still further, in order to obtain the pre-polished rice of a uniform quality in which there is no excessive fluctuation in the water content, from the pre-polished rice producing apparatus as has been described, it is preferable that the pre-polished rice producing apparatus be installed in an environment of stable temperature and humidity, and the pre-polished rice producing apparatus be operated under a stable environment in which temperature and humidity in the atmosphere (ambient air) are maintained within a certain constant range.

However, if a special air-conditioning equipment and so on are to be installed in order to maintain the constant environmental conditions (temperature and humidity) in the atmosphere (ambient air) in the place of installation of the pre-polished rice producing apparatus, an extremely high expense must be prepared for the equipment and facility.

SUMMARY OF THE INVENTION

The present invention has been devised in order to solve the problems described above. An object of the present invention is to provide a rice polisher for performing a rice polishing process which is a preprocess necessary for producing a pre-polished rice (dried washed rice) having a favorable taste by using a small amount of water; a pre-polished rice producing apparatus of a water saving type for producing the pre-polished rice by using the above rice polisher; a pre-polished rice producing apparatus capable of producing the pre-polished rice having a good taste and good preservability; a pre-polished rice producing apparatus capable of constantly producing the high quality pre-polished rice and capable of reducing labor of a human operator; a pre-polished rice producing apparatus of a small size and easy to maintain; a pre-polished rice producing apparatus allowing automatic internal polishing; a pre-polished rice producing apparatus capable of preventing uneven drying of the raw material white rice at the drying section thereby preventing quality deterioration of the pre-polished rice; a leveling device capable of uniformly leveling a grain; or a pre-polished rice producing facility capable of maintaining ambient atmospheric conditions (temperature and humidity) within a constant range thereby making possible to produce the pre-polished rice of a high quality as well as to eliminate a major expense in facility and equipment thereby saving energy.

In order to achieve the above mentioned object, a rice polisher according to a first aspect of the present invention comprises: a grain-lifting spiral for transporting a white rice above from below; a port for pouring polishing water, the port being disposed at a head portion; a discharge port for discharging the white rice, the discharge port being disposed at the head portion; and a rice-polishing roll for polishing rice by agitating together with the polishing water poured from the port for poring the white rice pressurized by transportation by the grain-lifting spiral; wherein the rice polisher discharges from the discharge port the white rice that has been polished.

According to the rice polisher provided by the first aspect of the present invention, the white rice (polished rice) is transported from below toward above by the grain-lifting spiral, and the polished rice is pressurized in the transportation. The polished rice that is pressurized is agitated by the rice polishing roll with the polishing water poured from the water-pouring port provided at the head portion in the rice polishing process is done, surfaces of the polished rice are rubbed. This rice polishing process separates the impurities (object to be removed) such as aleurone residue from the surface of the polished rice and solves them in the polishing water.

According to the pre-polished rice producing apparatus provided by the first aspect of the present invention, the polishing water is poured from the water-pouring port at the top portion, and then flows down naturally. On the other hand, the polished rice is transported by the grain-lifting spiral from below toward above, in a reverse direction to the flow of polishing water, and then discharged from the discharge port at the head portion. With this arrangement, at the last stage of the rice polishing process (at the upper portion of the rice polishing roll), the polishing (washing, cleaning) is made by the pure fresh water from the head portion, while on the other hand, at the first stage of the rice polishing process (at the lower portion of the rice polishing roll), the polishing (washing, cleaning) is made by the dirty water already used in the last stage. In other words, purer water is used with the progress of the rice polishing process, making possible to efficiently perform the rice polishing process. As described above, since the dirty water is used in the earlier stage of the rice polishing process and purer water is used with the progress of the rice polishing process, there is no need for pouring a new amount of water (rinsing water), and thus it is possible to produce a tasty pre-polished rice with a small amount of water. Note that the “polished rice (raw material white rice)” is made into the “pre-polished rice” by being processed by the rice polishing process. When a consumer cooks the raw material white rice, the consumer must polish (wash) the raw material white rice before cooking, but when the consumer cooks pre-polished rice, the consumer does not need to polish (wash) the pre-polished rice because the pre-polished rice has already been polished (washed) at the rice polishing process.

A rice polisher according to a second aspect of the present invention comprises: a grain-lifting spiral for transporting white rice above from below; a port for pouring polishing water; a discharge port for discharging white rice, the discharge port being disposed at a head portion; a cylindrical rice polishing drum, the rice polishing drum having a water discharging port at an area forming a rice polishing chamber; and a rice polishing roll, the rice polishing roll being housed in the rice polishing drum and forming the rice polishing chamber between the rice polishing drum, the rice polishing roll being for polishing rice by agitating together with the polishing water poured from the water-pouring port the white rice pressurized in the rice polishing chamber by transportation by the grain-lifting spiral; wherein the rice polisher discharges from the discharge port the white rice that has been polished.

According to the rice polisher provided by the second aspect of the present invention, the polished rice (white rice) is transported from below toward above by the grain-lifting spiral, and the polished rice is pressurized in the rice polishing chamber (same as rice washing (cleaning) chamber) formed between the rice polishing drum (same as rice washing (cleaning) drum) and the rice polishing roll (same as rice washing (cleaning) roll). The polished rice that is pressurized is agitated by the rice polishing roll with the polishing water poured from the water-pouring port in the rice polishing process, in which surfaces of the polished rice are rubbed. This rice polishing process separates the impurities such as aleurone residue from the surface of the polished rice and solves them in the polishing water, and the water becomes wastewater. The wastewater, being prevented by the polished rice that is lifted by the grain-lifting spiral, does not easily flow down through the grain-lifting spiral. Therefore, the water discharge port is provided at the portion of the rice polishing drum where the rice polishing chamber is formed according to the present invention. With this arrangement, the waste water is discharged from this discharge port, and therefore is prevented from stagnating in the rice polishing chamber.

According to rice polisher provided by the second aspect of the present invention, the polishing water is poured from the water-pouring port, and then flows down naturally. On the other hand, the polished rice is transported by the grain-lifting spiral from below toward above, in a reverse direction to the flow of polishing water, and then discharged from the discharge port at the head portion. With this arrangement, at the last stage of the rice polishing process (at the upper portion of the rice polishing roll), the polishing is made by the pure fresh water from the head portion. On the other hand, at the first stage of the rice polishing process (at the lower portion of the rice polishing roll), the polishing (washing, cleaning) is made by the dirty water already used in the last stage. In other words, purer water is used with the progress of the rice polishing process, making possible to efficiently perform the rice polishing process. As described above, since the dirty water is used in the earlier stage of the rice polishing process and purer water is used with the progress of the rice polishing process, it is possible to produce a tasty pre-polished rice with a small amount of water.

Further, highly dirty waste water is discharged at the first stage of the rice polishing process, it becomes possible to prevent the rice bran component in the waste water from being absorbed into the polished rice (raw material white rice), to reduce dirtiness of the waste water, and to improve the taste of the pre-polished rice.

A pre-polished rice producing apparatus according to a third aspect of the present invention comprises: the rice polisher according to the first aspect of the present invention or according to the second aspect of the present invention described above; a dehydrating section for dehydrating the white rice discharged from the rice polisher; and a drying section for drying the white rice supplied from the dehydrating section. The dehydrating section and the drying section may be disposed sequentially from above toward below, on a single centerline serving as an axis of rotation, or may be disposed side by side on different centerline each serving as the axis of rotation for a corresponding component. Further, the axis's of rotation may be on a lateral centerline, or may be of a type known publicly.

The polished rice that has undergone the rice polishing process in the above rice polisher is then supplied to the dehydrating section, where the polishing water is dehydrated. The polished rice that has undergone the dehydrating process is then supplied to the drying section and dried to become pre-polished rice.

A pre-polished rice producing apparatus according to a fourth aspect of the present invention comprises the rice polisher according to the second aspect of the present invention provided with the water-pouring port at the head portion, and a dehydrating section for dehydrating the polished rice supplied from the rice polishing section, and is characterized in that a water obtained by dehydrating the white rice in the dehydrating section is poured to a lower portion of the rice polishing chamber.

According to the pre-polished rice producing apparatus provided by the fourth aspect of the present invention, the polished rice that has been polished by the rice polisher is supplied to the dehydrating section and dehydrated, and the polished rice that has been dehydrated is dried to be a pre-polished rice.

The dehydrate (squeezed) water obtained from the dehydration of the polished rice in the dehydrating section is the water that attached to the polished rice at the last stage (the upper portion of the rice polishing chamber) of the rice polishing process, and therefore relatively clean. Thus, even if this squeezed water is reused as the polishing water at the first stage of the rice polishing process, the bran component will not permeate into the polished rice, and so there is no chance for deterioration of the taste of the pre-polished rice. For this reason, according to the present invention, this squeezed water is supplied to the lower portion of the rice polishing chamber. With this arrangement, the amount of water to be pored from the water-pouring port into the rice polishing chamber can be reduced, resulting in further water saving.

A pre-polished rice producing apparatus according to a fifth aspect of the present invention comprises: a rice polishing section for polishing rice by agitating a white rice with polishing water; a dehydrating section for dehydrating the white rice supplied from the rice polishing section; a drying section for drying the white rice supplied from the dehydrating section; detecting means for detecting water content in the white rice dried by the drying section; and controlling means for adjusting the water content in the pre-polished rice on the basis of a white rice water content detected by the detecting means.

According to the pre-polished rice producing apparatus provided by the fifth aspect of the present invention, the polished rice is polished by agitation with the polishing water in the rice polishing section, in which surfaces of the polished rice are rubbed against each other, and impurities such as aleurone residue from the surface of the polished rice are separated from the surfaces of the polished rice and solve in the polishing water. The polished rice as polished is supplied to the dehydrating section and dehydrated with the polishing water. The polished rise as dehydrated is supplied to the drying section to become a pre-polished rice.

According to the pre-polished rice producing apparatus provided by the fifth aspect of the present invention, the detecting means detects the water content in the polished rice (pre-polished rice) dried by the drying section, and the water content in the polished rice is adjusted on the basis of the water content in the polished rice as detected, by the controlling means adjusting (through adjustment) for example of a temperature and a humidity of the drying section, and an amount of flow of the polished rice.

Therefore, the water content in the pre-polished rice can be brought within the 14 weight percent to 15 weight percent range. Thus, taste of the pre-polished rice can be improved by preventing the pre-polished rice from developing cracks in its surface. Further, by preventing mold growth and decomposition, preservability can be increased.

A pre-polished rice producing apparatus according to a sixth aspect of the present invention comprises: a rice polishing section for polishing rice by agitating a white rice with polishing water; a dehydrating section for dehydrating the white rice supplied from the rice polishing section; a drying section for drying the white rice supplied from the dehydrating section; detecting means for detecting water contents in the white rice supplied to the rice polishing section and in the white rice dried by the drying section; and controlling means for adjusting the water content in the pre-polished rice on the basis of white rice water contents detected by the detecting means.

According to the pre-polished rice producing apparatus provided by the sixth aspect of the present invention, the polished rice is polished by agitation with the polishing water in the rice polishing section, surfaces of the polished rice are rubbed, and impurities such as aleurone residue from the surface of the polished rice in are separated from the surfaces of the polished rice and solve in the polishing water. The polished rice as polished is supplied to the dehydrating section and dehydrated with the polishing water. The polished rise as dehydrated is supplied to the drying section to become a pre-polished rice.

Now, according to the pre-polished rice producing apparatus provided by the sixth aspect of the present invention, the detecting means detects the water content in the polished rice (raw material white rice) supplied to the polishing section and in the polished rice (pre-polished rice) dried by the drying section, and the water content in the pre-polished rice is adjusted on the basis of the water contents in the polished rice as detected, by the controlling means through adjustment for example of a temperature and a humidity of the drying section, and an amount of flow of the polished rice.

Therefore, the water content increase in the pre-polished rice as compared to the water content of the raw material white rice (normally around 14 weight percent to 15 weight percent) can be made within plus 0.5 weight percent, and the dirty waste water (discharge water) including aleurone residue can be prevented from being absorbed into the raw material white rice in the rice polishing section during rice polishing. Therefore, taste of the pre-polished rice can be improved.

Further, since the water content in the pre-polished rice can be brought within the 14 weight percent to 15 weight percent range, taste of the pre-polished rice can be improved by preventing the pre-polished rice from developing cracks in its surface. Further, by preventing mold growth and decomposition, preservability can be increased.

A pre-polished rice producing apparatus according to a seventh aspect of the present invention in the pre-polished rice producing apparatus according to the sixth aspect is characterized in that the drying section dries the white rice by blowing warm air on the white rice; the detecting means one of continually and periodically measures the water content in the white rice supplied to the rice polishing section and in the white rice dried by the drying section; the controlling means can adjust difference in water contents between the white rice supplied to the rice polishing section and the white rice dried by the drying section, by changing at least one of an amount of the white rice supplied to the rice polishing section, temperature of the warm air, amount of the warm air blown, and duration of time in which the white rice is dried in the drying section; and the difference in water contents is not adjusted by the controlling means when water contents difference obtained from measurement by the detecting means is not greater than or equal to a first norm, the first norm being a limit indicating favorable quality of the pre-polished rice, and the difference in water contents is adjusted to be within the first norm by the controlling means when water contents difference obtained from the measurement by the detecting means exceeds the first norm.

According to the pre-polished rice producing apparatus provided by the seventh aspect of the present invention, the polished rice is dried by warm air sent to the drying section.

Further, the detecting means (same as measuring device) makes measurement of the water contents in the polished rice and in the polished rice constantly or periodically. At the same time, the controlling means (same as controlling device) is capable of adjusting a water content difference between the raw material white rice and the pre-polished rice (hereinafter called water content difference), by changing at least one of an amount of supply of the polished rice to the rice polishing section, a temperature of the warm air, an amount of flow of the warm air, and duration of drying time for the polished rice (pre-polished rice) in the drying section.

Here, the adjustment of the water content difference by the controlling means is not performed (operation at the present status is continued) if the water content difference obtained from the measurement by the detecting means is not greater than a first norm (a value that provides a limit to a favorable quality of the pre-polished rice). On the other hand, the water content difference is adjusted to within the first norm by the controlling means if the water content difference obtained from the measurement by the detecting means exceeds the first norm. With this arrangement, the quality of the pre-polished rice can be maintained in any of the cases.

As described, the detecting mans measures the water contents in the raw material white rice and in the pre-polished rice constantly or periodically, and operating status of the pre-polished rice producing device is determined based on the results of these measurements thereby maintaining the quality of the processed rice at a favorable level. Therefore, it is possible to produce the high quality processed rice constantly.

Further, since the detecting means automatically measures the water contents of the raw material rice and of the pre-polished rice, and since the operating status of the pre-polished rice producing apparatus is automatically determined, it becomes possible to save labor of the human operator.

A pre-polished rice producing apparatus according to an eighth aspect of the present invention in the pre-polished rice producing apparatus according to the seventh aspect is characterized in that operation is stopped when water contents difference obtained from the measurement by the detecting means exceeds a second norm, the second norm being a limit at which the water contents difference can be adjusted to within the first norm by the controlling means.

According to the pre-polished rice producing apparatus provided by the eighth aspect of the present invention, if the water content difference (moisture difference) obtained through the measurement by the detecting means exceeds the second norm (a limit value from which the controlling means can adjust the water content difference within the first norm), then the operation is stopped. Therefore it is possible to prevent produce of the pre-polished rice of a low quality.

A pre-polished rice producing apparatus according to a ninth aspect of the present invention comprises: a rice washing section, the rice washing section including a supplying mechanism for supplying raw material white rice and washing rice by agitating with washing water the raw material white rice supplied by the supplying mechanism; and an apparatus main body, the apparatus main body housing therein a dehydrating section, the dehydrating section connected to the rice washing section and being for dehydrating the raw material white rice supplied from the rice washing section, and housing therein a drying section, the drying section connected to the dehydrating section and being for drying the raw material white rice supplied from the dehydrating section; wherein the rice washing section is disposed on a supporting shaft supported by the apparatus main body, and the rice washing section is pivotable around the supporting shaft, thereby being attachable to and detachable from the apparatus main body.

According to the pre-polished rice producing apparatus provided by the ninth aspect of the present invention, the raw material white rice supplied by the supplying mechanism is washed (polished, cleaned) by agitation with the washing (polishing, cleaning) water in the rice washing (polishing, cleaning) portion (section) In this rice washing (polishing, cleaning) process, impurities such as aleurone residue are separated from the surfaces of the polished rice and solve in the washing water. The raw material white rice as washed is supplied to the dehydrating section of the apparatus main body and dehydrated. The raw material white rice as dehydrated is supplied to the drying section to become a pre-polished rice.

Here, the apparatus main body supports the supporting shaft, and the rice washing section is provided on the supporting shaft. With this arrangement, the rice washing section is pivotable around the supporting shaft, thereby being attachable to and detachable from the apparatus main body. Therefore, by simply rotating the rice washing section thereby separating the rice washing section from the apparatus main body, there can be exposed the connecting portion of the rice washing section with the dehydrating section, and the connecting portion of the dehydrating section with the rice washing section. Thus, it becomes easy to disassemble and reassemble the rice washing section and the drying section (and depending on parts structure of the rice washing section and the drying section, it becomes possible to clean and wash the rice washing section and the drying section without disassembling the rice washing section or the drying section). Therefore, it becomes possible to make easy to maintain the pre-polished rice producing apparatus (including cleaning, washing as well as disassembling and reassembling of the rice washing section and the drying section).

Further, as described, an exposure of the connecting portion of the rice washing section with the dehydrating section and the connecting portion of the dehydrating section with the rice washing section is done by simply rotating the rice washing section. Therefore, proper maintenance of the rice washing section and the dehydrating section becomes possible even if the rice washing section and the dehydrating section are not sufficiently oversized. This makes it possible to reduce the size of the pre-polished rice producing apparatus.

A pre-polished rice producing apparatus according to a tenth aspect of the present invention comprises: a rice washing section, the rice washing section including a cylindrical rice washing drum having a lower portion and an upper portion, the lower portion disposed with a supplying port and the upper portion disposed with a discharge port, a grain-lifting spiral disposed at a lower side of the rice washing drum, the grain-lifting spiral including a columnar rotating shaft and a screw blade formed in a spiral on an outer circumference of the rotating shaft, for transporting a raw material white rice supplied from the supply port into the rice washing drum from below to above by rotation of the rotating shaft and the screw blade, and a rice washing roll disposed at the upper portion in the rice washing drum, the rice washing roll being for washing by agitation with washing water the raw material white rice transported by the grain-lifting spiral, with the rice washing section discharging the raw material white rice subject to a rice washing process from the discharge port; a dehydrating section for dehydrating the raw material white rice supplied via the discharge port, the dehydrating section being connected to the rice washing portion; and a drying section for drying the raw material white rice supplied from the dehydrating section, the drying section being connected to the dehydrating section; wherein the rice washing drum has an open at a lower end, and a gap between the screw blade and the rice washing drum above the supplying port has a size such that the raw material white rice is not crushed and a gap between the screw blade and the rice washing drum above the supplying port has a size such that the raw material white rice does not fall.

According to the pre-polished rice producing apparatus provided by the tenth aspect of the present invention, the grain-lifting spiral (the rotating shaft and the screw blade (same as rice polishing (washing) screw)) rotates in the rice washing section thereby washing the raw material white rice supplied from the supplying port into the rice washing drum, in which the raw material white rice is agitated by the rice washing roll with the washing water while being transported from below toward above. In this rice washing process, impurities such as aleurone residue are separated from the surfaces of the polished rice and solve in the washing water. The raw material white rice as polished is discharged from the discharge port of the rice washing drum, and dehydrated in the dehydrating section. The raw material white rice as dehydrated is supplied to the drying section to become a pre-polished rice.

Since the rice washing drum has an opening at lower end, rice (the raw material white rice) remaining in the rice washing drum can be discharged from the lower end opening of the rice washing drum by rotating the rotating shaft in the reverse direction as against in normal operation by the spiral. With this constitution, there no longer is need for separating the grain-lifting spiral from the rice washing drum at the time of the maintenance operation when the residual rice in the rice washing drum is discharged outside of the rice washing drum, and therefore the maintenance can become easier.

Further, cleaning, washing and so on of the inside of the rice washing drum, the grain-lifting spiral and the rice washing roll can be performed easily by passing water through the rice washing drum and then allowing the water to discharge from the lower end opening of the rice washing drum. Thus, there no longer is need for separating the grain-lifting spiral and the rice washing roll from the rice washing drum at the time of the maintenance operation when cleaning, washing and so on of the rice washing drum, grain-lifting spiral and the rice washing roll is performed. Thus, there no longer is need for disassembling and reassembling the rice washing section when cleaning, washing and other maintenance activities to the inside of the rice washing drum, grain-lifting spiral and the rice washing roll is performed. Therefore, the maintenance can become even easier.

Further, since the grain-lifting spiral and the rice washing roll can be easily attached and detached from the lower end opening of the rice washing drum, maintenance (including repair and replacement) of the inside of the rice washing drum (including the supplying port and the discharge port), the grain-lifting spiral and the rice washing roll can be performed easily.

Still further, the gap between the screw and the rice washing drum at above side of the supply port is a gap (enough) not to produce crushed pieces of the raw material white rice. Therefore, crushing of the raw material white rice when transporting the raw material white rice by the grain-lifting spiral can be prevented. On the other hand, the gap between the rice washing drum and the grain-lifting screw blade at below side of the supply port is a gap (enough) not to allow the raw material white rice to fall. Therefore, the raw material white rice can be prevented from falling off the lower end opening of the rice washing drum during the normal operation. At the same time, the dirty waste water resulting from the washing of the raw material white rice in the rice washing section can be discharged from the lower end opening of the rice washing drum.

A pre-polished rice producing apparatus according to an eleventh aspect of the present invention in the pre-polished rice producing apparatus according to the tenth aspect is characterized by that a row (bar) of the screw blade is formed on a portion of the rotating shaft above the supplying port and two rows (bars) of the screw blade are formed on a portion of the rotating shaft below the supplying port.

According to the pre-polished rice producing apparatus provided by the eleventh aspect of the present invention, a single row of the screw is formed on the rotating shaft above the supply port. Therefore, the raw material white rice is further prevented from being crushed during the transportation of the raw material white rice by the grain-lifting spiral. On the other hand, two rows of the screw are formed on the rotating shaft below the supply port. Therefore, the raw material white rice is further prevented from falling off the lower end opening of the rice washing drum during the normal operation.

A pre-polished rice producing apparatus according to a twelfth aspect of the present invention in the pre-polished rice producing apparatus according to the tenth aspect or the eleventh aspect is characterized in that a port for pouring washing water is disposed inside and at an upper portion of the rice washing drum, the rotating shaft being rotatable in both normal and reverse directions, the grain-lifting spiral transporting the raw material white rice above from below by rotation of the rotating shaft in the normal direction; and internal washing at the rice washing section is performed by rotating the rotating shaft in the reverse direction while pouring washing water from the port.

According to the pre-polished rice producing apparatus provided by the twelfth aspect of the present invention, the internal cleaning of the rice washing section is performed by rotating the rotating shaft in the reverse direction while pouring the washing water from the water-pouring port. Specifically, the washing water washes inside of the rice washing drum, the grain-lifting spiral and the rice washing roll, and then is discharged from the lower end opening of the rice washing drum. At the same time, the raw material white rice (residual rice) remaining in the rice washing drum is streamed down by the washing water, and then moved down by the grain-lifting spiral (screw) and then discharged from the lower end opening of the rice washing drum. Thus, the internal cleaning operation of the rice washing section including the discharging operation of the residual rice can be automated, and therefore the maintenance of the rice washing section can become easier.

A pre-polished rice producing apparatus according to a thirteenth aspect of the present invention comprises: a rice washing section, the rice washing section including a supplying mechanism for supplying a raw material white rice and washing rice by agitating with washing water the raw material white rice supplied by the supplying mechanism; a dehydrating section for dehydrating the raw material white rice supplied from the rice washing section, the dehydrating section being connected to the rice washing section; and a drying section, the drying section including a disc-shaped rotating drying disc and a leveling member disposed above the drying disc, the drying section being connected to the dehydrating section, the drying section being for drying the raw material white rice supplied from the dehydrating section by blowing air to the raw material white rice while the raw material white rice is leveled by the leveling member; wherein the drying section is provided with a thickness sensor for detecting a thickness of a layer of the raw material white rice on the drying disc on a side of the leveling member which side is opposite to a direction of the rotation of the drying disc; and at least one of a volume reduction adjustment of an amount of the raw material white rice from the supplying mechanism and a speed increase adjustment of a rotating speed of the drying disc is performed if the thickness of the layer of the raw material white rice detected by the thickness sensor is thicker than a predetermined range.

According to the pre-polished rice producing apparatus provided by the thirteenth aspect of the present invention, the raw material white rice supplied by the supplying mechanism is washed by agitation with the washing water in the rice washing portion. In this rice washing process, impurities such as aleurone residue are separated from the surfaces of the polished rice and solve in the washing water. The raw material white rice that has undergone the rice washing process is supplied to the dehydrating section and dehydrated. The raw material white rice that has undergone the dehydrating process is supplied onto the drying disc in the drying section and undergoes the drying process. The raw material white rice is dried by a blast of air applied to the raw material white rice while being leveled by the leveling member to become a pre-polished rice.

The thickness sensor detects the thickness of the layer of the raw material white rice on the drying disc on the side of the leveling member the reverse rotating direction of the drying disc. If the thickness of the layer of the raw material white rice as detected by the thickness sensor is thicker than a predetermined range, at least one of the volume reduction adjustment of the amount of the raw (material rice from the supplying mechanism and the speed increase adjustment of the rotating speed of the drying disc is performed. With this arrangement, the thickness of the layer of the raw material white rice on the drying disc is thinned, and be into the predetermined range, and the raw material white rice is prevented from overflowing from the leveling member when the raw material white rice is being leveled by the leveling member. This makes possible to always maintain a constant thickness of the layer of the raw material white rice after the leveling. Therefore, uneven drying of the raw material white rice is prevented, and quality deterioration in the pre-polished rice is prevented.

A pre-polished rice producing apparatus according to a fourteenth aspect of the present invention comprises: a rice washing section, the rice washing section including a supplying mechanism for supplying a raw material white rice and washing rice by agitating with washing water the raw material white rice supplied by the supplying mechanism; a dehydrating section for dehydrating the raw material white rice supplied from the rice washing section, the dehydrating section being connected to the rice washing section; and a drying section, the drying section including a disc-shaped rotating drying disc and a leveling member disposed above the drying disc, the drying section being connected to the dehydrating section, the drying section being for drying the raw material white rice supplied from the dehydrating section by blowing air to the raw material white rice while the raw material white rice is leveled by the leveling member; wherein the drying section is provided with a thickness sensor for detecting a thickness of a layer of the raw material white rice on the drying disc on a side of the leveling member which side is opposite to a direction of the rotation of the drying disc; and at least one of a volume increase adjustment of a supply amount of the raw material white rice by the supplying mechanism and a speed reduction adjustment of a rotating speed of the drying disc is performed if the thickness of the layer of the raw material white rice detected by the thickness sensor is thinner than a predetermined range.

According to the pre-polished rice producing apparatus provided by the fourteenth aspect of the present invention, the raw material white rice supplied by the supplying mechanism is polished by agitation with the washing water in the rice washing portion. In this rice washing process, impurities such as aleurone residue are separated from the surfaces of the polished rice and solve in the washing water. Further, the raw material white rice that has undergone the rice washing process is supplied to the dehydrating section and dehydrated. The raw material white rice that has undergone the dehydrating process is supplied onto the drying disc in the drying section and undergoes the drying process. The raw material white rice is dried by a blast of air applied to the raw material white rice while being leveled by the leveling member to become a pre-polished rice.

The thickness sensor detects the thickness of the layer of the raw material white rice on the drying disc on the side of the leveling member which side is anti-rotating direction side of the drying disc. If the thickness of the layer of the raw material white rice as detected by the thickness sensor is thinner than a predetermined range, at least one of the volume increase adjustment of the amount of the raw material rice from the supplying mechanism and the speed decrease adjustment of the rotating speed of the drying disc is performed. With this arrangement, the thickness of the layer of the raw material white rice on the drying disc is thickened into the predetermined range, the raw material white rice leveled by the leveling member is prevented from forming recesses after being leveled by the leveling member. This makes possible to always maintain a constant thickness of the layer of the raw material white rice after the leveling. Therefore, uneven drying of the raw material white rice is prevented.

A pre-polished rice producing apparatus according a fifteenth aspect of the present invention, in the pre-polished rice producing apparatus according to a thirteenth aspect or a fourteenth aspect is characterized in that the thickness sensor detects a thickness of the layer of the raw material white rice on the drying disc near the leveling member.

According to the pre-polished rice producing apparatus provided by the fifteenth aspect of the present invention, the thickness sensor detects a thickness of a layer of the raw material white rice on the drying disc near the leveling member. Thus, the detection of the thickness is made at a ridge portion (mounting like shape portion) where the leveling member holds an upper portion of the raw material white rice. This prevents a situation in which the detection is made to an irregularly undulated surface of the raw material white rice, as will be expected in such a case as the thickness sensor detects the thickness of the layer of the raw material white rice far away from the leveling member. Therefore, a relatively stable measurement of the thickness of the layer of the raw material white rice is possible.

A leveling device according to a sixteenth aspect of the present invention comprises: a receiving member, the receiving member having a horizontal receiving surface for receiving a grain supplied onto the receiving surface; and an adjusting member, the adjusting member disposed above the receiving surface in a state in which relative movement of the receiving member is permitted in a predetermined direction parallel to the receiving surface, with vertical and horizontal positions of the adjusting member relative to the receiving surface and a slanting angle of a side surface which side surface is opposite to the predetermined direction with respect to the predetermined direction being adjustable, and the grain on the receiving surface being leveled by relative movement of the receiving member in the predetermined direction.

According to the leveling device provided by the sixteenth aspect of the present invention, the grain supplied onto the receiving surface is leveled by the adjusting member due to that the receiving member is moved relatively with respect to the adjusting member in a direction parallel to the receiving surface.

With the above, vertical and the horizontal position of the adjusting member relative to the receiving surface as well as slanting angle of the surface away from (opposite) a predetermined direction with respect to the predetermined direction can be adjusted corresponding to the kind, amount of supply, state and so on of the grain supplied on the receiving surface. Therefore, it becomes possible to favorably level the grain regardless of the kind, the amount of supply or the state of grain supplied onto the receiving surface.

For this reason, if the leveling device is applied for example, to a drying section of the prior art pre-polished rice producing apparatus described above, the raw material rice supplied to the drying disc can be leveled favorably into a constant level, making possible to obtain a processed rice of a uniform quality in which there is no excessive fluctuation in the water content.

A leveling device according to a seventeenth aspect of the present invention in the leveling device according to the sixteenth aspect is characterized in that the leveling device further comprises an elastic controlling (regulating) member, the controlling member disposed above the receiving surface and at a side of the predetermined direction with respect to the adjusting member in a state in which the receiving member is permitted to relatively move in the predetermined direction, with the grain on the receiving surface being leveled by the relative movement of the receiving member in the predetermined direction.

According to the leveling device provided by the seventeenth aspect of the present invention, the grain on the receiving surface after being leveled by the adjusting member is further leveled by the controlling member due to that the receiving member is moved relatively to the controlling member in a predetermined direction.

Here, since the controlling member is elastic, the controlling member can level the grain on the receiving surface while deforming elastically. Therefore, despite the amount of supply and the state of the grain supplied to the receiving surface as well as variation in the amount of grain supply during the operation of the leveling device, the grain can be leveled further preferably.

For this reason, if the leveling device is applied for example, to a drying section of the prior art pre-polished rice producing apparatus described above, the raw material rice supplied to the drying disc can be leveled even more favorably into a more constant level, making possible to obtain a processed rice of a more uniform quality in which there is even less fluctuation in the water content.

A pre-polished rice producing facility according to an eighteenth aspect of the present invention comprises: a pre-polished rice producing apparatus comprising a rice washing section for washing rice by agitating a raw material white rice with washing water, a dehydrating section for dehydrating the raw material white rice supplied from the rice washing section, and a drying section for drying the raw material white rice supplied from the dehydrating section by warm air heated by a heater; a dust remover for removing dust from supplied air; a dehumidifying drier for dehumidifying and drying the supplied air; wherein the facility is incorporated within a single building, discharge air discharged from the drying section of the pre-polished rice producing apparatus is supplied to the dust remover for removing dust, discharge air after the dust removal by the dust remover is supplied to the dehumidifying drier for the dehumidification and drying, and discharge air after the dehumidification and drying by the dehumidifying drier is supplied to the drying section of the pre-polished rice producing apparatus.

According to the pre-polished rice producing facility provided by the eighteenth aspect of the present invention, a pre-polished rice producing apparatus, a dust remover and a dehumidifying dryer are installed in a single building.

When the pre-polished rice is produced, the raw material white rice is washed by agitation with the washing water in the rice washing portion of the pre-polished rice producing apparatus. In this rice washing process, impurities such as aleurone residue are separated from the surfaces of the white rice and solve in the washing water. Further, the raw material white rice that has undergone the rice washing process is supplied to the dehydrating section and dehydrated. The raw material white rice that has undergone the dehydrating process is supplied to the drying section and dried by a warm air heated by the heater to become a pre-polished rice.

In the single building, discharged air (warm moisture wind) discharged from the drying section of the pre-polished rice producing apparatus is supplied to the dust remover, where the dust is removed. Discharged air (warm moisture wind) after the dust removal by the dust remover is then supplied to the dehumidifying dryer, where dehumidification and drying is performed, and then discharged air (dry warm wind) after the dehumidification and drying is supplied to the drying section of the pre-polished rice producing apparatus. Specifically, the dry warm wind generated (heated by the heater) in the drying section of the pre-polished rice producing apparatus is re-circulated for recycled use.

Therefore, the pre-polished rice producing apparatus can be operated while environmental conditions (temperature and moisture) in the ambient air are maintained in a constant range. In addition, since there is no need for a special air-conditioning system for example, there is no need for a major expense in facility and equipment. Further, an output level of the heater in the drying section of the pre-polished rice producing apparatus can be small, resulting in efficiency and energy saving.

As described, according to the pre-polished rice producing facility provided by the eighteenth aspect of the present invention, environmental conditions (temperature and moisture) in the atmosphere (ambient air) can be maintained within a constant range, and therefore it is possible to produce the pre-polished rice uniform and high in quality. In addition, there is no need for a major expense in facility and equipment, leading to energy saving.

A pre-polished rice producing apparatus according to a nineteenth aspect of the present invention comprises: a rice polisher including a grain-lifting spiral for transporting polished rice above from below, a port for pouring polishing water, a discharge port for the polished rice, the discharge port disposed at a head portion, a cylindrical rice polishing drum, the rice polishing drum having a water discharge port at an area forming a rice polishing chamber, and a rice polishing roll, the rice polishing roll housed in the rice polishing drum and forming a rice polishing chamber between the rice polishing drum, the rice polishing roll being for polishing rice by agitating together with the polishing water poured from the water-pouring port the polished rice pressurized by transportation by the grain-lifting spiral, with the polisher discharging from the discharge port the polished rice that has been polished; a dehydrating section for dehydrating the polished rice discharged from the rice polisher; and a drying section for drying the polished rice supplied from the dehydrating section.

According to the pre-polished rice producing apparatus provided by the nineteenth aspect of the present invention, the polishing water is poured only from the water-pouring port at the top portion, and then flows down naturally. On the other hand, the polished rice is transported by the grain-lifting spiral from below toward above, in a reverse direction to the flow of polishing water, and then discharged from the discharge port at the head portion. With this arrangement, at the last stage of the rice polishing process (at the upper portion of the rice polishing roll), the polishing is made by the pure fresh water from the head portion, while on the other hand, at the first stage of the rice polishing process (at the lower portion of the rice polishing roll), the polishing is made by the dirty water already used in the last stage. In other words, purer water is used with the progress of the rice polishing process, making possible to efficiently perform the rice polishing process. As described above, since the dirty water is used in the earlier stage of the rice polishing process and purer water is used with the progress of the rice polishing process, there is no need for pouring a new amount of rinsing water, and thus it is possible to produce a tasty pre-polished rice with a small amount of water.

A rice polisher according to a twentieth aspect of the present invention comprises: a grain-lifting spiral for transporting a white rice above from below; a port for pouring polishing water; a discharge port for the white rice, the discharge port disposed at ahead portion; a rice polishing drum, the rice polishing drum having a water discharge port, the water discharge port provided at a portion forming a rice polishing chamber, the discharge port being for discharging polished-waste water to thereby prevent the polished-waste water from stagnating inside; and a rice polishing roll, the rice polishing roll housed in the rice polishing drum, the rice polishing roll forming a rice polishing chamber between the rice polishing drum, the rice polishing roll polishing rice by agitating together with the polishing water that is poured from the port and that flows naturally below from above the white rice pressurized by transportation in the rice polishing chamber by the grain-lifting spiral; wherein the rice polisher discharges from the discharge port the white rice that has been polished.

A rice polisher according to a twenty-first aspect of the present invention comprises: a grain-lifting spiral for transporting a white rice above from below; a port for pouring polishing water; a discharge port for the white rice, the discharge port disposed at a head portion; a pressure-operated valve, the valve provided at the discharge port, the valve being opened by a degree corresponding to a pressure applied thereto when the pressure is no less than a predetermined value; a rice polishing drum, the rice polishing drum having a water discharge port disposed at a portion forming a rice polishing chamber; and a rice polishing roll, the rice polishing roll housed in the rice polishing drum, the rice polishing roll forming the rice polishing chamber between the rice polishing drum, the rice polishing roll polishing rice by agitating together with the polishing water that is poured from the port the white rice pressurized in the rice polishing chamber by transportation by the grain-lifting spiral; wherein the rice polisher discharges from the discharge port the white rice that has been polished.

A pre-polished rice producing apparatus according to a twenty-second aspect of the present invention comprises: a rice polishing section for polishing rice by agitating white rice with polishing water; a dehydrating section for dehydrating the white rice supplied from the rice polishing section; a drying section for drying by warm air the white rice supplied from the dehydrating section, the warm air being generated by heating the atmosphere, the white rice supplied from the dehydrating section being rotated; detecting means for detecting water content in the white rice dried by the drying section; and controlling means for adjusting the water content in a pre-polished rice on the basis of the water content in the white rice detected by the detecting means, the controlling means being able to adjust the water content, by changing at least one of speed of the rice polishing process in the rice polishing section, amount of the polishing water being poured, temperature of the atmosphere, humidity of the atmosphere, amount of flow of the warm air, and rotating speed of the white rice in the drying section.

According to the pre-polished rice producing apparatus provided by the twenty-second aspect of the present invention, the polished rice is polished by agitation with the polishing water in the rice polishing section, surfaces of the polished rice are rubbed against, and impurities such as aleurone residue from the surface of the polished rice are separated from the surfaces of the polished rice and solve in the polishing water. The polished rice as polished is supplied to the dehydrating section and dehydrated together with the polishing water. The polished rise as dehydrated is supplied to the drying section. In the drying section, warm wind is generated by heating the atmosphere. The polished rice supplied to the drying section is dried by the warm wind while being rotated thereby becoming a pre-polished rice.

According to the pre-polished rice producing apparatus provided by the twenty-second aspect of the present invention, the detecting means detects the water content in the polished rice (pre-polished rice) dried by the drying section, and the water content in the pre-polished rice is adjusted on the bases of the water content in the polished rice as detected, by the controlling means through adjustment for example at least one of speed of the rice polishing process in the rice polishing section, amount of the polishing water being poured, temperature of the atmosphere, humidity of the atmosphere, amount of flow of the warm air, and rotating speed of the white rice in the drying section.

A pre-polished rice producing apparatus according a twenty-third aspect of the present invention comprises: a rice polishing section for polishing rice by agitating white rice with polishing water; a dehydrating section for dehydrating the white rice supplied from the rice polishing section; a drying section for drying by warm air the white rice supplied from the dehydrating section, the warm air being generated by heating the atmosphere, the white rice supplied from the dehydrating section being rotated; detecting means for detecting water contents in the white rice supplied to the rice polishing section and in the white rice dried by the drying section; and controlling means for adjusting the water content in a pre-polished rice by adjusting, on the basis of the white rice water contents detected by the detecting means, at least one of speed of the rice polishing process in the rice polishing section, amount of the polishing water being poured, temperature of the atmosphere, humidity of the atmosphere, temperature of the warm air, humidity of the warm air, amount of flow of the warm air, and rotating speed of the white rice in the drying section.

According to the pre-polished rice producing apparatus provided by the twenty-third aspect of the present invention, the polished rice is polished by agitation with the polishing water in the rice polishing section, surfaces of the polished rice are rubbed, and impurities such as aleurone residue from the surface of the polished rice are separated from the surfaces of the polished rice and solve in the polishing water. The polished rice as polished is supplied to the dehydrating section and dehydrated with the polishing water. The polished rise as dehydrated is supplied to the drying section. In the drying section, warm wind is generated by heating the atmosphere. The polished rice supplied to the drying section is dried by the warm wind while being rotated, and becomes a pre-polished rice.

According to the pre-polished rice producing apparatus provided by the twenty-third aspect of the present invention, the detecting means detects the water contents in the polished rice (raw material white rice) supplied to the rice polishing section and in the polished rice (pre-polished rice) dried by the drying section, and the water content in the pre-polished rice is adjusted on the basis of the water contents in the polished rice as detected, by the controlling means through adjustment on at least one of a speed of the rice polishing process in the rice polishing section, an amount, temperature and humidity of the polishing water being poured, a temperature of the atmosphere, a humidity of the atmosphere, an amount of flow of the warm air and a rotating speed of the polished rice in the drying section.

DESCRIPTION OF THE PREFERRED EMBODIMENTS

First Embodiment

Figure 1:
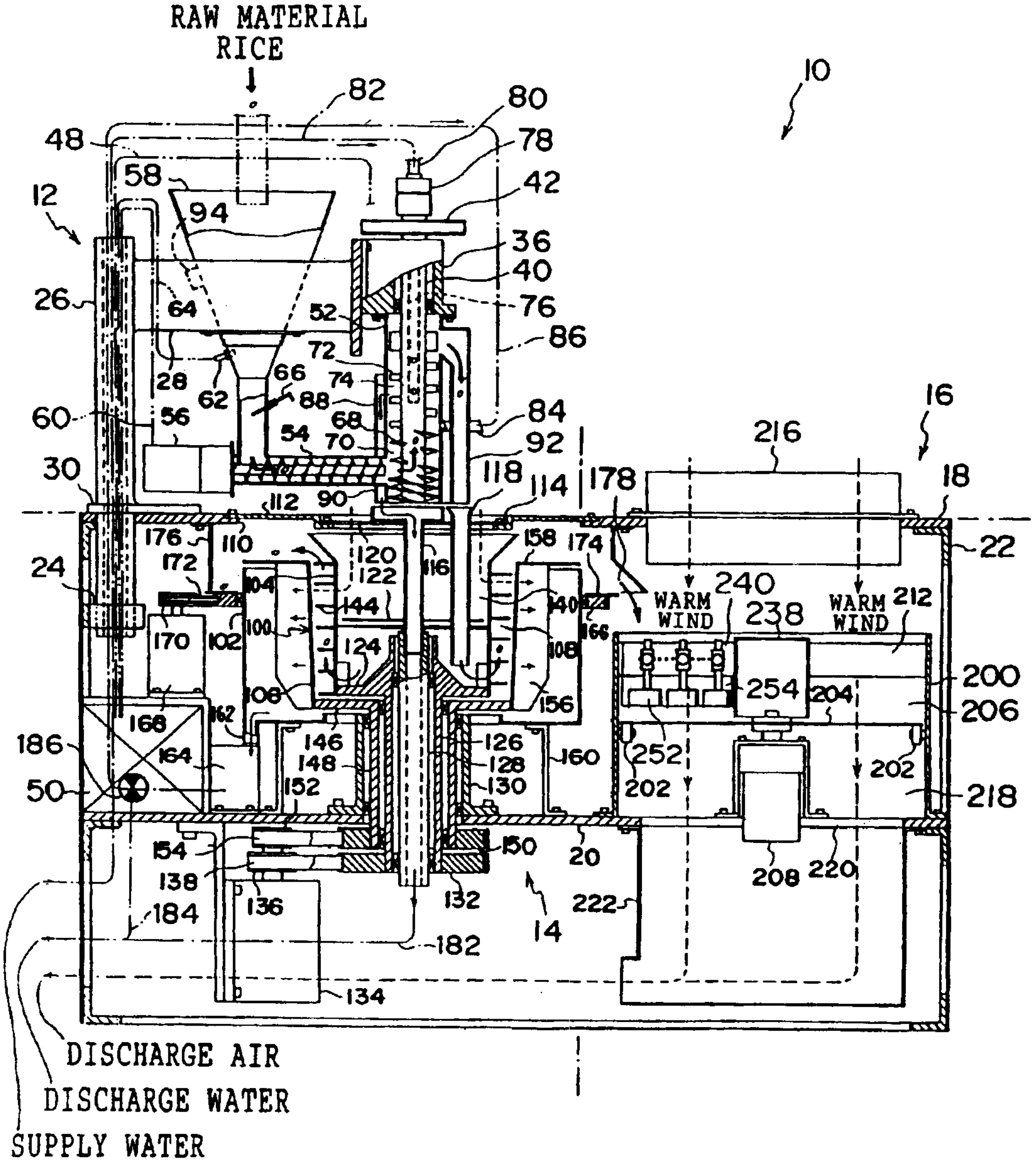
FIG. 1 is a vertical sectional front view of a pre-polished rice producing apparatus according to a first embodiment.
Figure 2:
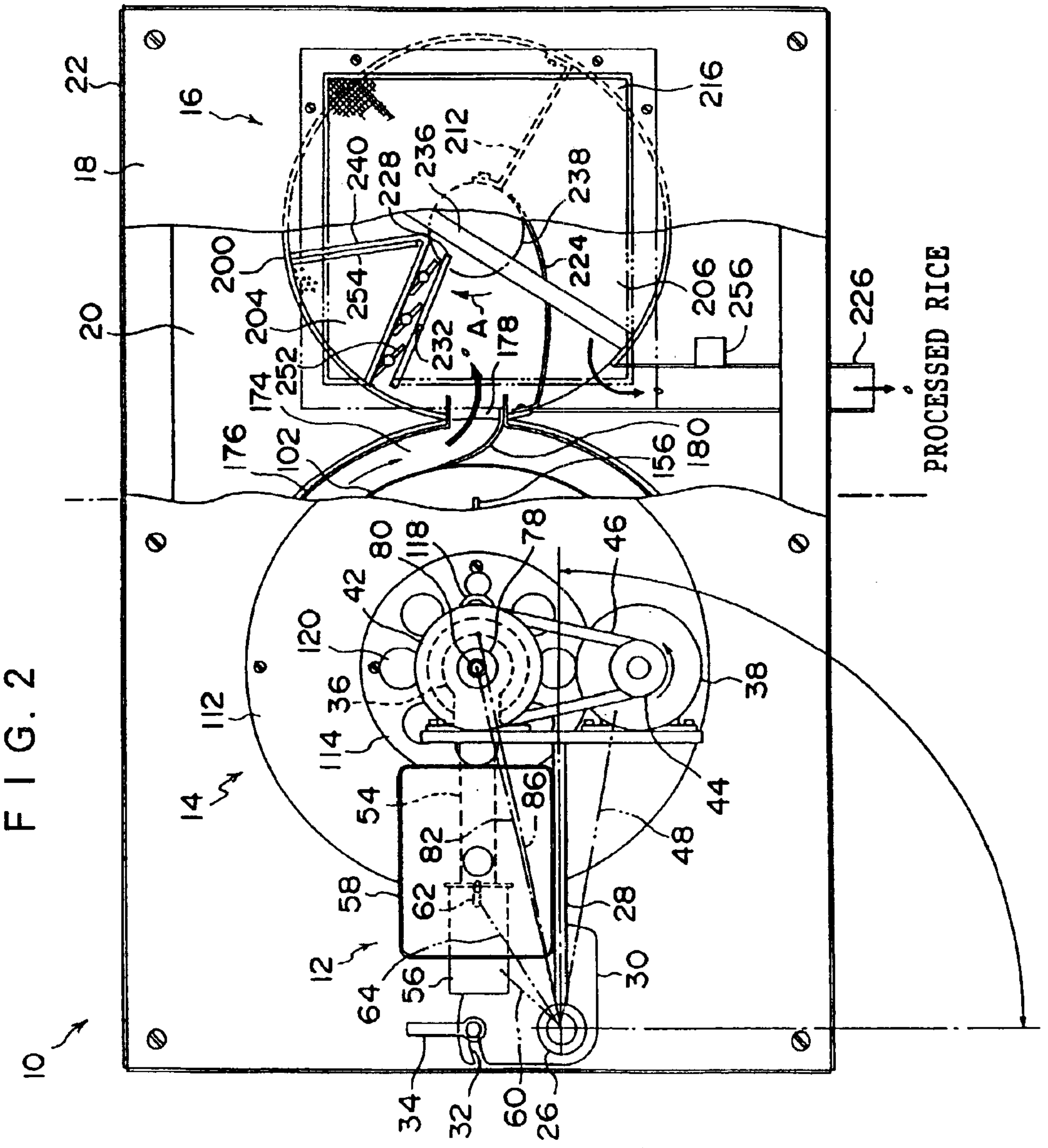
FIG. 2 is a plan view with a partial section of the pre-polished rice producing apparatus according to the first embodiment.

FIG. 1 is a sectional front view showing a pre-polished rice producing apparatus 10 according to a first embodiment of the present invention. FIG. 2 is a plan view with a partial section of the pre-polished rice producing apparatus 10.

The pre-polished rice producing apparatus 10 according to the present embodiment comprises an upright type rice polishing section 12, a dehydrating section 14, and a drying section 16 including a leveling device provided by the present invention. The dehydrating section 14 and the drying section 16 are incorporated in a main body 18 of the apparatus. Inside the main body 18, an installation table 20 is provided. The main body 18 has an outer circumference (four circumferential surfaces) provided with a cover 22.

The main body 18 has an inner wall supporting a supporting member 24. The supporting member 24 rotatably supports a lower portion of a post 26 provided by a cylinder and serving as a supporting shaft. The post 26 has an upper portion extending upward out of an upper wall of the main body 18. The post 26 has a top portion integrally provided with an arm 28. The arm 28 is provided with the rice polishing section 12.

The post 26 has a vertically intermediate portion integrally provided with a generally fan-shaped base 30. The base 30 contacts an upper surface of the main body 18. Near the arc portion of the base 30, an arc-shaped cutout 32 is provided along the arc portion. The cutout 32 has one end open. Correspondingly to the cutout 32 and on the upper surface of the main body 18, a clamp lever 34 is provided pivotably on its end portion. The clamp lever 34 is fastened, with the end portion of the clamp lever 34 contacted to the other end of the cutout 32, thereby preventing the post 26 from rotation, and thereby attaching the rice polishing section 12 to the main body 18. Further, by loosening the clamp lever 34, the post 26 can become rotatable, thereby making possible to pivot the rice polishing section 12 around the post 26 to detach the rice polishing section 12 from the main body 18. The rice polishing section 12 can pivot by the stopper plate 180 degrees with respect to the main body 18, from the state in which the rice polishing section 12 is attached to the main body 18 (i.e. the state in which the other end of the cutout 32 contacts the end portion of the clamp lever 34).

Figure 3:
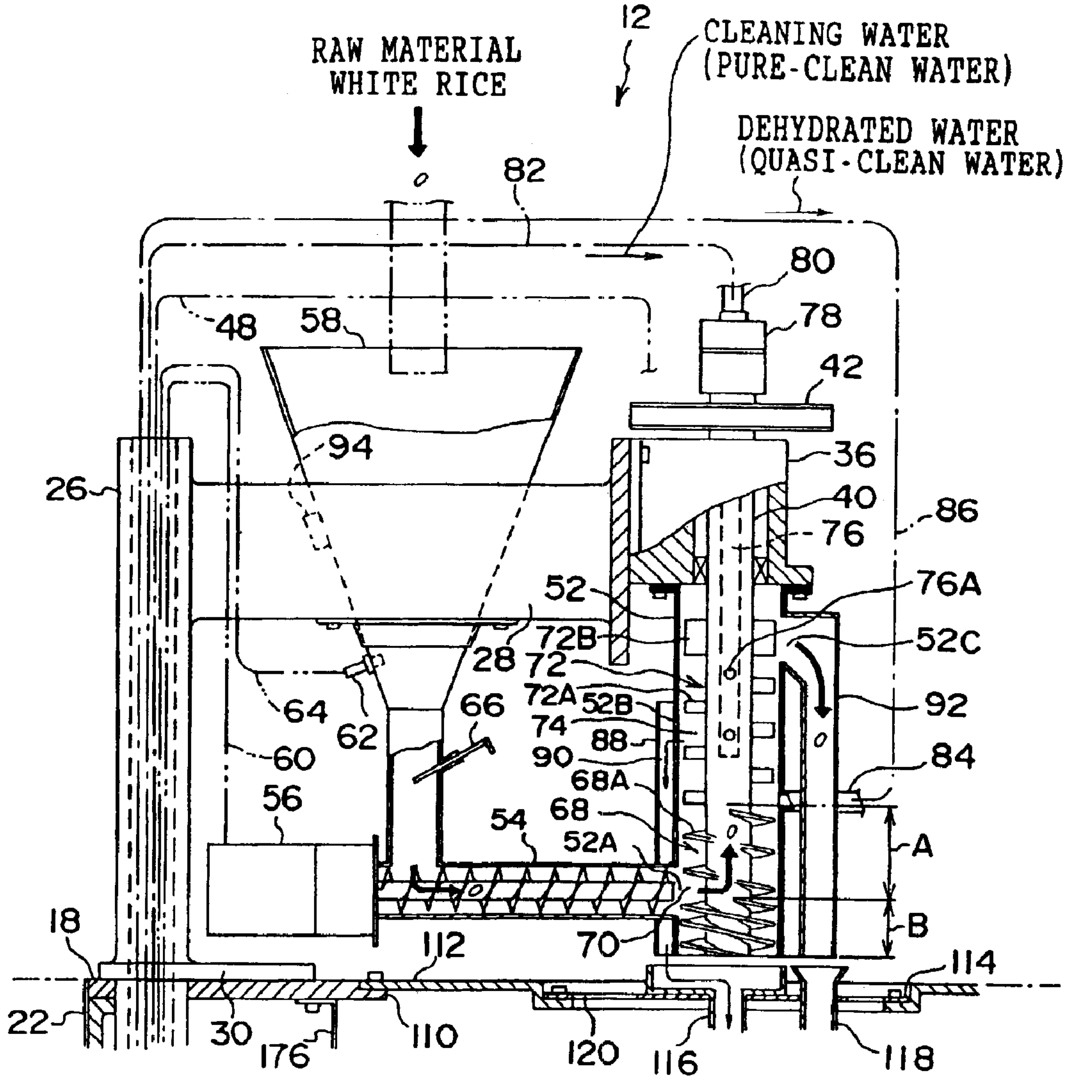
FIG. 3 is a vertical sectional front view showing a detail of the rice polishing section according to the first embodiment.

As shown in FIG. 3, the rice polishing section 12 is provided with a bearing member 36. The bearing member 36 is fixed to the arm 28. The rice polishing section 12 is provided with a rice polishing motor (also called rice cleaning motor) 38. The rice polishing motor 38 is also fixed to the arm 28. The bearing member 36 rotatably supports a columnar rotating shaft 40. The rotating shaft 40 has an upper portion and a lower portion each extending out of the bearing member 36. The rotating shaft 40 has a portion above the baring member 36, provided with a pulley 42. The pulley 42 is connected via a belt 46 with a pulley 44 fixed to a drive shaft of the rice polishing motor 38. With this arrangement, by driving the rice polishing motor 38, the rotating shaft 40 can be rotatable in normal and reverse directions. The rice polishing motor 38 has a wire 48 running through the post 26 and connected to a control panel 50 (See FIG. 1 and FIG. 4) provided in the main body 18.

The bearing member 36 has a lower portion supporting an upper end of a cylindrical rice polishing drum 52. The rice polishing drum 52 incorporates within itself the rotating shaft 40. The rice polishing drum 52 has an open lower end, allowing attaching and detaching of the rotating shaft 40 (i.e. a grain-lifting spiral 68 and a rice polishing roll 72 as will be described below) from the lower opening of the rice polishing drum 52. The rice polishing drum 52 has a side wall near its lower end, formed with a supply port 52A. The supply port 52A is provided, right next thereof, with a screw feeder 54 as part of a supply mechanism. The screw feeder 54 is provided with a supplying motor 56. The supplying motor 56 drives the screw feeder 54. The screw feeder 54 is connected with a hopper 58 as part of the supply mechanism. The hopper 58 is fixed to the arm 28, and is open upward. With this arrangement, when the hopper 58 is supplied with a raw material white rice (polished rice, or the same as the raw material rice) as a grain, the screw feeder 54 transports the raw material white rice through the supply port 52A into the rice polishing drum 52. The supplying motor 56 has a wire 60 running through the post 26 and connected with the control panel 50.

The hopper 58 has a lower portion provided with a raw material sensor 62. The raw material sensor 62 detects presence and absence of the raw material white rice in the hopper 58. The raw material sensor 62 has a wire 64 running through the post 26 and connected with the control panel 50. If the raw material sensor 62 detects there no longer is the raw material white rice in the hopper 58, then in a predetermined period of time, the entire pre-polished rice producing apparatus 10 (the rice polishing motor 38, the supplying motor 56, and components as will be described later including a dehydrating motor 134, a pump 164, a transporting motor 168, a drying motor 208, and a heater 216) is stopped. Further, the hopper 58 has a portion below the raw material sensor 62, provided with a flow controlling shutter 66. The flow controlling shutter 66 controls the amount of the raw material white rice being supplied to the rice polishing drum 52. Further, the hopper 58 is provided with an automatic moisture meter 94 serving as detecting means. The automatic moisture meter 94 constantly or periodically detects (measures) water content of the raw material white rice, and is connected with the controlling apparatus 50 via connection through the post 26. The automatic moisture meter 94 is preferably a nondestructive type (i.e., a high-frequency-wave resistance type or a permittivity type is preferable).

The rotating shaft 40 in the rice polishing drum 52 has a lower portion formed with a screw 68A providing the grain-lifting spiral 68. The grain-lifting spiral 68 and the rice polishing drum 52 provide in between a grain-lifting chamber 70. With this arrangement, when the rotating shaft 40 is rotated in a normal direction, the grain-lifting spiral 68 transports the raw material white rice within the grain-lifting chamber 70 from below toward above. A portion above the supply port 52A (a potion indicated by code A in FIG. 3) is formed with a single spiral of the screw 68, and a space between the screw 68A and the rice polishing drum 52 is small enough (about 5 mm for example) not to crush the raw material white rice. On the other hand, a portion below the supply port 52A (a potion indicated by code B in FIG. 3) is formed with two spirals of the screw 68, and a space between the screws 68A and the rice polishing drum 52 is small enough (not greater than 1 mm for example) not to allow the raw material white rice to pass through.

Within the rice polishing drum 52, the rotating shaft 40 has an outer circumference right above the screw 68A, formed with a plurality of columnar projections 72A. The columnar projections 72A are disposed in a spiral pattern. Further, in the rice polishing drum 52, the rotating shaft 40 has an outer circumference right above the projections 72A, formed with a plurality of sweeping plates 72B. Each of the sweeping plates 72B is disposed in parallel to the axis (center of rotation) of the rotating shaft 40. The rotating shaft 40, the projections 72A and the sweeping plates 72B constitute a rice polishing roll 72 on an upper portion of the rotating shaft 40 within the rice polishing drum 52. A space between the rice polishing drum 52 and the rice polishing projections 72A of the rice polishing roll 72 provides a rice polishing chamber 74. With this arrangement, when the rotating shaft is rotated in the normal direction, the raw material white rice is agitated in the rice polishing chamber 74 by the projections 72A, with resistance created by the weight of the raw material rice being lifted.

Along the axial center of the rotating shaft 40, from a top end of the rotating shaft to an intermediate portion of the portion formed with the projections 72A, a water supplying port 76 is formed. The water supplying port 76 communicates with a plurality of water-pouring holes 76A. The water-pouring holes 76A are formed in a region from above the uppermost projection 72A to an intermediate portion of the region formed with the projections 72A. The rotating shaft 40 has an upper end provided with a connector 78. The connector 78 provides a sealed connection between the rotating shaft 40 as a rotating member and a piping 80 as a stationary member. The piping 80 is connected with a tube 82. The tube 82 runs through the post 26, through the main body 18 and then out of the main body 18. The tube 82 is connected with a water supplying tank (not illustrated) provided outside of the main body 18. The water supplying tank supplies polishing water (pure fresh water, or the same as fresh pure water) to the water supplying port 76 via the tube 82, the piping 80 and the connector 78. The polishing water is then poured from the pouring holes 76A into the rice polishing chamber 74 (i.e. the upper portion of the rice polishing drum 52 (the head portion of the rice polishing section 12)). Thus, the raw material white rice is polished in the rice polishing chamber 74. It should be noted here that since the polishing water should only be poured into the head portion (top portion) of the rice polishing section 12, the water-pouring holes 76A may be provided as through holes penetrating a side wall of the head of rice polishing drum 52, the bearing member 36 or others.

The rice polishing drum 52 has a portion below a region formed with the rice polishing chamber 74, provided with a water supplying pipe 84. The rice polishing drum 52 and the water supplying pipe 84 are communicated with each other. The water supplying pipe 84 is connected with a tube 86. The tube 86 runs through the post 26 and connected to a pump 164 of the dehydrating section 14 to be described later. As will be described later, squeezed water resulting from dehydration of the raw material white rice in the dehydrating section 14 is introduced to the lower portion of the rice polishing chamber 74 via the pump 164, the tube 86 and the water supplying pipe 84.

The rice polishing drum 52 has a region, from a vertically intermediate portion formed with the rice polishing chamber 74 to an upper portion formed with the grain-lifting chamber 70, where there is formed a multiplicity of water discharging holes 52B. The water discharging holes 52B allow dirty waste water (discharge water) containing aleurone residue, thereby reducing the level of dirtiness of the polishing water in the rice polishing chamber 74. Alternatively, the discharging holes 52B may be provided in the entire portion where the rice polishing chamber 74 is formed. The rice polishing drum 52 has an outer circumference surrounded by a discharging wall 88, from the portion where the discharging holes 52B are formed to the lower end. A space between the rice polishing drum 52 and the water discharging wall 88 provides a water discharging chamber 90. With this arrangement, the waste water (discharge water) discharged from the multiple discharging holes 52B is discharged through the water discharging chamber 90 and then from near the lower end of the rice polishing drum 52 downwardly. Further, since the lower end of the rice polishing drum 52 is open as has been described earlier, dirty water (discharge water) after passing the rice polishing chamber 74 and the grain-lifting chamber 70 is discharged downwardly from the lower end of the rice polishing drum 52. This reduces the level of dirtiness in the polishing water in the rice polishing chamber 74 and in the grain-lifting chamber 70.

The rice polishing drum 52 has an upper portion (head portion of the rice polishing section 12) corresponding to the sweeping plates 72B of the rice polishing roll 72, formed with a discharge port 52C. The raw material white rice as after the polishing process is discharged by the transportation provided by the grain-lifting spiral 68 and the rotation of the sweeping plates 72B, from the rice polishing roll 72 via the discharge port 52C, out of the rice polishing drum 52. The discharge port 52C is communicated with a discharging pipe 92 fixed to an upper portion of the rice polishing drum 52. The discharging pipe 92 has an end covering the discharge port 52C and is provided vertically along the rice polishing drum 52. With this arrangement, the raw material white rice discharged from the discharge port 52C falls down through the discharging pipe 92, out of a lower end of the discharging pipe 92.

Figure 4:
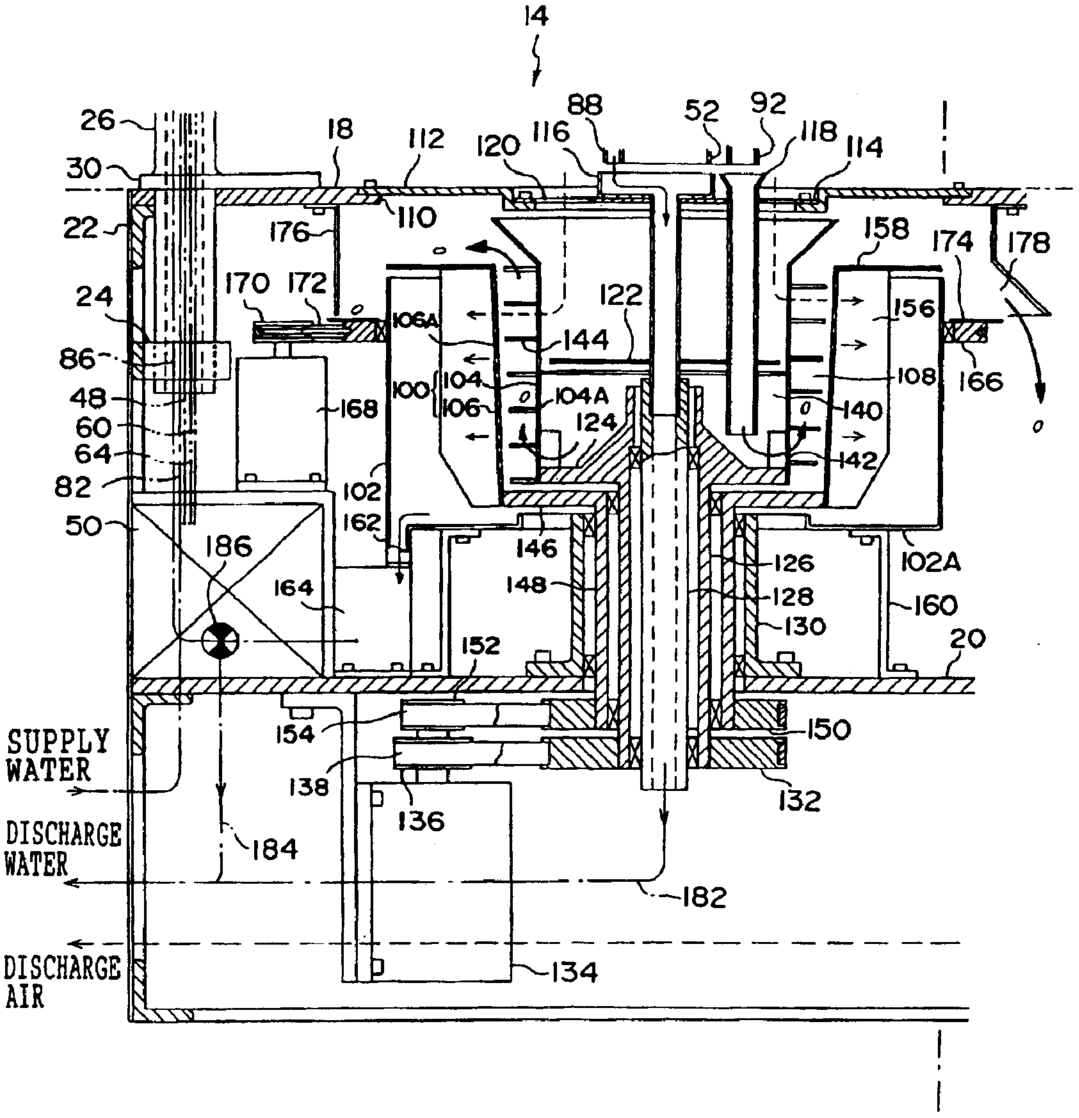
FIG. 4 is a vertical sectional front view showing a detail of a dehydrating section according to the first embodiment.

As shown in FIG. 4, the dehydrating section 14 is disposed within the main body 18 right below the rice polishing section 12. The dehydrating section 14 includes a centrifugal dehydrating drum 100 and an outer sheath drum 102. The centrifugal dehydrating drum 100 includes a dehydrating inner drum 104 and a dehydrating outer drum 106. Each of the dehydrating inner drum 104 and the dehydrating outer drum 106 is cylindrical, has an open upper end, and disposed uprightly. A space between the dehydrating inner drum 104 and the dehydrating outer drum 106 provides a dehydrating chamber 108. On the other hand, the outer sheath drum 102 is cylindrical, has an open upper end, and is disposed uprightly so as to cover the centrifugal dehydrating drum 100.

Corresponding to the dehydrating section 14, the main body 18 has an upper wall formed with an access opening 110. The access opening 110 is provided with an annular outer cover 112 serving as a detachable cover. Further, a generally disc shaped inner cover 114 serving as a detachable cover is provided in the outer cover 112. If the outer cover 112 is moved off the upper wall of the main body 18 together with the inner cover 114, the entire access opening 110 is exposed, making an access to the inside of the outer sheath drum 102. On the other hand, if the inner cover 114 only is moved off the upper wall of the main body 18 (the outer cover 112), the access opening 110 is exposed partially, making an access only to the inside of the dehydrating inner drum 104.

The inner cover 114 has a center portion provided with a vertical water receiving pipe 116. The water receiving pipe 116 has an upper end enlarged correspondingly to the rice polishing drum 52 and the discharging wall 88. The water receiving pipe 116 has a lower portion reaching a lower portion of the dehydrating inner drum 104. With this arrangement, the waste water (discharge water) from the lower end of the water discharging chamber 90 and from the lower end of the rice polishing drum 52 is caught by the upper end of the water receiving pipe 116, and then the waste water (discharge water) falls down within the water receiving pipe 116.

The inner cover 114 is provided with a vertical rice receiving pipe 118. The rice receiving pipe 118 has an enlarged upper end disposed right beneath the discharging pipe 92. The rice receiving pipe 118 has a lower portion reaching close to a lower end of the dehydrating inner drum 104. With this arrangement, the raw material white rice discharged from the discharging pipe 92 after the rice polishing process at the rice polishing section 12 falls down through the rice receiving pipe 118 to the lower end of the dehydrating inner drum 104.

The inner cover 114 is formed with a plurality of circumferential air-intake ports 120. As will be described later in detail, these air-intake ports 120 provide paths for air taken into the dehydrating inner drum 104. Each of the water receiving pipe 116 and the rice receiving pipe 118 provided in the inner cover 114 is provided with a windshield plate 122. The windshield plates 122 are disposed at a vertically intermediate portion in the dehydrating inner drum 104. Therefore, the air from the air-intake ports 120 is prevented by these windshield plates 122 from reaching a lower portion in the dehydrating inner drum 104.

The dehydrating inner drum 104 has a lower end provided with a lower end plate 124. The lower end plate 124 is provided with a cylindrical shaft 126 fixed thereto. Inside the cylindrical shaft 126, there is fixed an un-rotatable cylindrical water discharging pipe 128. The water discharging pipe 128 communicates with an outside of the main body 18 via a water discharging channel 182. The cylindrical shaft 126 is rotatably supported, via a cylindrical shaft 148 to be described later, by a bearing stand 130 fixed to the installation table 20. The cylindrical shaft 126 has a lower end provided with a pulley 132. The pulley 132 is connected, via a belt 138, with a pulley 136 fixed to a drive shaft of the dehydrating motor 134. With this arrangement, when the dehydrating motor 134 is driven, the cylindrical shaft 126 and the lower end plate 124 are rotated, and thus the dehydrating inner drum 104 is rotated. The water discharging pipe 128 has an upper end, to which a lower end of the water receiving pipe 116 is detachably inserted. Thus, the waste water (discharge water) flowing down through the water receiving pipe 116 as described above is discharged outside of the main body 18 via the water discharging pipe 128 and the water discharging channel 182.

The dehydrating inner drum 104 has a circumferential surface formed with a multiplicity of air blowing holes 104A. A space inside the dehydrating inner drum 104 serves as an air-blow chamber 140. The dehydrating inner drum 104 has a lower-end circumferential surface formed with a plurality of transfer ports 142 circumferentially. The raw material white rice fallen from the rice receiving pipe 118 onto the lower end plate 124 receives a centrifugal force from the rotating lower end plate 124, thereby being transferred to a lower portion of the dehydrating chamber 108. Further, the dehydrating inner drum 104 has an outer circumferential surface provided with a screw (may also be called dehydrating screw) 144. When the dehydrating inner drum 104 is rotated, the screw 144 is rotated integrally, thereby lifting the raw material white rice in the lower portion of the dehydrating chamber 108 to an upper portion of the dehydrating chamber 108.

The dehydrating outer drum 106 has a lower end provided with a lower end plate 146. The lower end plate 146 is provided with the cylindrical shaft 148 fixed thereto. The cylindrical shaft 148 surrounds the cylindrical shaft 126 and is rotatably supported by the bearing stand 130. The cylindrical shaft 148 has a lower end provided with a pulley 150. The pulley 150 is connected, via a belt 154, with a pulley 152 fixed to a drive shaft of the dehydrating motor 134. With this arrangement, when the dehydrating motor 134 is driven, the cylindrical shaft 148 and the lower end plate 146 are rotated, and thus the dehydrating outer drum 106 is rotated. The pulley 150 has a diameter equal to a diameter of the pulley 132. The pulley 152 has a diameter slightly smaller than a diameter of the pulley 136.

The dehydrating outer drum 106 has a circumferential surface formed with a multiplicity of discharging holes 106A for discharge of water and air. The dehydrating outer drum 106 has an outer circumferential surface formed with a plurality of wind generating blades 156. With this arrangement, when the dehydrating outer drum 106 is rotated, the wind generating blades 156 are rotated integrally, thereby generating wind outside of the dehydrating outer drum 106 (i.e. within the outer sheath drum 102), and the wind passes through, in the order of the air-intake ports 120, the air-blow chamber 140, the air blowing holes 104A, the dehydrating chamber 108, the discharging holes 106A and the outer sheath drum 102, thereby dehydrating the polishing water covering the raw material white rice being lifted through the dehydrating chamber 108. Further, since the windshield plate 122 prevents the air from reaching the lower portion of the dehydrating inner drum 104 (the air-blow chamber 140) as has been described earlier, the amount of the air blow into the lower side of the dehydrating chamber 108 is small. On the other hand, the amount of the air blow to the upper side of the dehydrating chamber 108 is large. The reason for this is that the raw material white rice in the lower side of the dehydrating chamber 108 is covered by a large amount of polishing water, and therefore a large amount of the water can be drained even if the amount of the air blow into the lower side of the dehydrating chamber 108 is small. On the other hand, the raw material white rice in the upper side of the dehydrating chamber 108 is covered by a small amount of polishing water, and therefore the raw material white rice can be dehydrated efficiently by sending a large amount of the air blow into the upper side of the dehydrating chamber 108.

The entire outer circumference of the upper end of the dehydrating outer drum 106 is formed with a transfer plate 158. The raw material white rice that has undergone the dehydrating process and discharged from the upper end of the dehydrating chamber 108 is transferred onto the transfer plate 158 by centrifugal force. The transfer plate 158 is disposed above the outer sheath drum 102. When the dehydrating outer drum 106 is rotated, the transfer plate 158 is rotated integrally, and thus the raw material white rice on the transfer plate 158 receives a centrifugal force and the raw material white rice falls off an outer circumferential edge of the transfer plate 158. The outer circumference of the transfer plate 158 is right above the circumferential wall of the outer sheath drum 102. Therefore, the raw material white rice falling off the outer circumferential edge of the transfer plate 158 passes outside of the outer sheath drum 102.

The outer sheath drum 102 has a lower end provided with a lower surface plate 102A. The lower surface plate 102A is fixed to the installation table 20 via a fixing member 160. The lower surface plate 102A is connected with a transporting pipe 162. Waste water squeezed from the raw material white rice in the dehydrating chamber 108 flows through the discharging holes 106A and the outer sheath drum 102, and then falls through the transporting pipe 162. The transporting pipe 162 is connected with the pump 164. The pump 164 is connected with the water supplying pipe 84 via the above described tube 86. Near the pump 164, the tube 86 is connected with the above described water discharging channel 182 via a branching pipe 184. A selector valve 186 is provided at a portion where the tube 86 is connected with the branching pipe 184. During the normal operation, the selector valve 186 closes the branching pipe 184, and opens the tube 86, allowing the waste water from the transporting pipe 162 transported by the pump 164 through the tube 86 and the water supplying pipe 84 to the lower portion of the rice polishing chamber 74.

The outer sheath drum 102 has an outer circumference supporting a pulley 166. The pulley 166 is connected, via a belt 172, with a pulley 170 fixed to a drive shaft of the transporting motor 168. The pulley 166 has an upper surface provided with an annular transfer plate 174 fixed thereto. The transfer plate 174 is disposed below the transfer plate 158, surrounding the outer circumference of the outer sheath drum 102, and rotates integrally with the pulley 166. Therefore, when the transporting motor 168 is driven, the transfer plate 174 is rotated integrally with the pulley 166. As will be described later, the raw material white rice that has undergone the dehydrating process and fallen from the transfer plate 158 onto the transfer plate 174 receives a centrifugal force to move outward of the transfer plate 174.

Correspondingly to the transfer plate 174, the main body 18 has a lower surface of the upper wall provided with an upper end of a cylindrical stopper drum 176. The stopper drum 176 has a circumferential wall almost right above the outer circumference of the transfer plate 174. A gap between a lower edge of the circumferential wall of the stopper drum 176 and transfer plate 176 is small enough not to allow the raw material white rice to pass through. Thus, all grains of the raw material white rice from the transfer plate 158 is fallen by the circumferential wall of the stopper drum 176, whereas the raw material white rice on the transfer plate 174 is prevented from falling off the transfer plate 174. The stopper drum 176 is formed with a transporting channel (may also called chute) 178 in the circumferential wall on a side closer to the drying section 16. The transfer channel 178 has a pair of opposed side walls 178A (See FIG. 5). A curved stopper plate 180 (See FIG. 5.) is bridged between one of the side walls 178A (specifically, the side wall 178A on the downstream side with respect to the rotation of the transfer plate 174) and the outer sheath drum 102. A gap between a lower edge of the stopper plate 174 and the transfer plate 174 is small enough not to allow the raw material white rice to pass through. With this arrangement, rotation of the raw material white rice on the transfer plate 174 is prevented by the stopper plate 180, and the raw material white rice is fallen off the transfer plate 174, and then transferred to the drying section 16 via the transfer channel 178.

Figure 5:
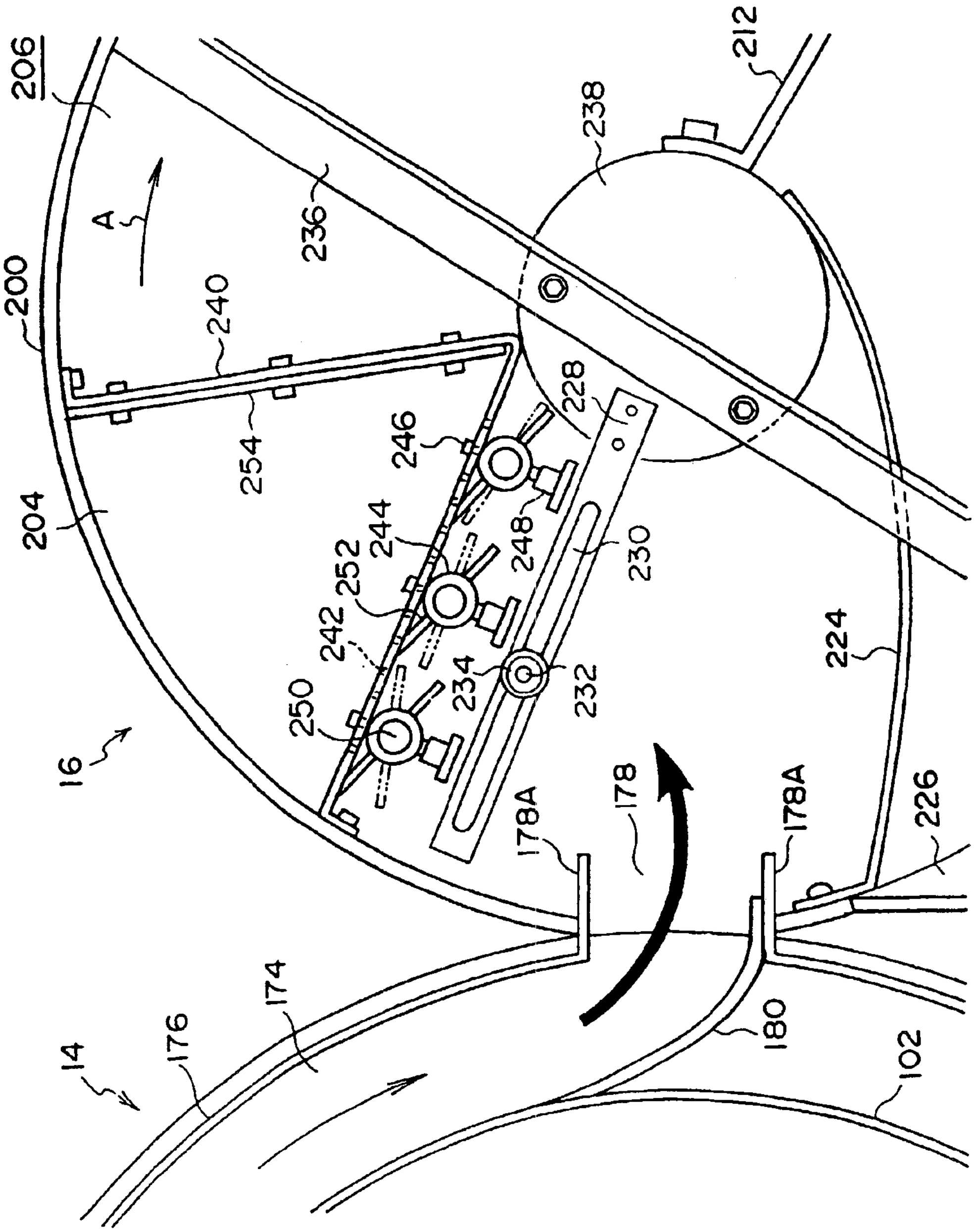
FIG. 5 is a plan view showing a detail of a drying section according to the first embodiment.
Figure 6:
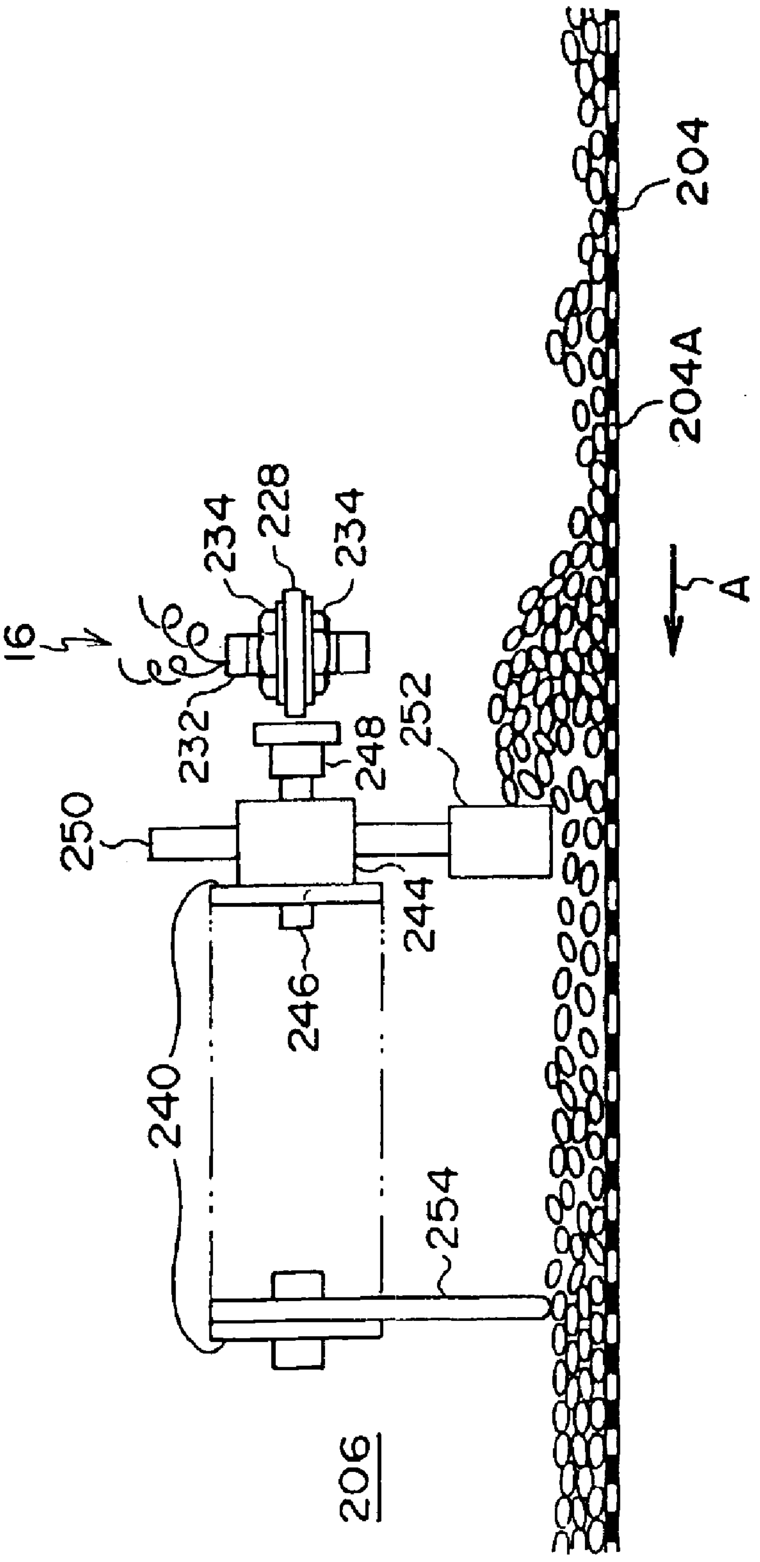
FIG. 6 is a side view showing a detail of a constitution for thickness detection and leveling in the drying section according to the first embodiment.

As shown in FIG. 5 and FIG. 6, the drying section 16 is disposed in the main body 18 adjacent to the dehydrating section 14. The drying section 16 includes a drying drum 200. The drying drum 200 is installed uprightly on the installation table 20. The drying drum 200 has an inner circumferential wall provided with a plurality of bearing rolls 202 fixed thereto. These bearing rolls 202 supports thereon a disc like drying disc 204 serving as a receiving member. With this arrangement, the drying disc 204 is rotatably supported, with its upper surface serving as a receiving surface being horizontal in the drying drum 200. The drying drum 200 has an open upper end. The drying drum 200 has a portion above the drying disc 204 serving as a drying chamber 206. The raw material white rice which has undergone the dehydrating process comes from the transfer channel 178 and the upper end opening of the drying drum 200, and then falls on the drying disc 204 on a side closer to the dehydrating section 14.

The drying disc 204 has a center provided with a drive shaft of the drying motor 208. When the drying motor 208 is driven, the drying disc 204 is rotated in a direction parallel to the upper surface (in a direction indicated by code A in FIG. 2 and FIG. 5). The upper end of the drying drum 200 is bridged by a long plate-like bracket 236. The bracket 236 hangs a generally cylindrical cover 238 having an upper surface, over the upper surface. Further, another bracket 212 is provided between the cover 238 and the drying drum 200, on a side away from the dehydrating section 14, placing the cover 238 on the center of the drying chamber 206.

The drying drum 200 has an inner circumferential surface, which supports, near a location where the raw material white rice is supplied onto the drying disc 204 and slightly downstream with respect to the direction A, two end portions of a supporting member 240 which make a shape of V as in a plan view. The supporting member 240 has a portion relatively upstream with respect to the direction A, where a plurality of screw holes 242 is formed horizontally. The supporting member 240 is provided with a predetermined number (specifically three according to the present embodiment) of cylindrical adjusting columns 244. Each of the adjusting columns 244 is fixed to the supporting member 240 by a fixing screw 246 threaded into a corresponding one of the screw holes 242. Each of the adjusting columns 244 has a circumferential wall penetrated by a fixing screw 248. Each of the columns 244 is fitted by a cylindrical adjusting plate shaft 250. The adjusting plate shaft 250 is fixed to the adjusting column 244 by a fixing screw 248 tightened so that a tip of the fixing screw 248 presses on the adjusting plate shaft 250. Each of the adjusting plate shaft 250 has a lower end integrally provided with a rectangular adjuster plate 252 serving as a leveling member and adjusting member. With this arrangement, a predetermined number (specifically three according to the present embodiment) of the adjuster plates 252 are disposed above the upper surface of the drying disc 204. Therefore, when the drying disc 204 is rotated in the predetermined direction A, the raw material white rice on the drying disc 204 makes contacts with each of the adjuster plates 252, hitting its surface facing away from the direction A thereby being leveled (coarse leveling) by its lower edge (See FIG. 6).

On the other hand, if the fixing screw 248 is loosened to unlock the fixation of the adjusting plate shaft 250 to the adjusting column 244, then a vertical relative position of the adjuster plate 252 with respect to the upper surface of the drying disc 204 as well as a slanting angle of a side surface of the adjuster plate 252 with respect to the predetermined direction A, which side is an upper stream side of the predetermined direction A, can be adjusted. Further, the adjusting column 244 can be fixed to the supporting member 240 by using a different one of the screw holes 242 by the fixing screw 246. Then, horizontal position with respect to the upper surface of the drying disc 204 can be adjusted. It should be noted here that according to the present embodiment, the predetermined number of the adjuster plates 252 are disposed at a horizontally equal interval, and each of the adjuster plate 252 is slanted so that the surface facing the direction A is slanted against the direction A by a same angle. With this arrangement, there is little gap between the adjuster plates 252 radially of the drying disc 204. So, the predetermined number of adjuster plates 252 are disposed generally over the entire distance between the drying drum 200 and the cover 238, making possible to level the raw material white rice on the drying disc 204 generally over its entire surface.

The supporting member 240 has a portion relatively downstream of the direction A, to which an upper portion of a rectangular controlling plate 254 serving as a controlling member is fixed. In this arrangement, a plurality of the controlling plate 254 is disposed above the upper surface of the drying disc 204. Therefore, when the drying disc 204 is rotated in the predetermined direction A, the raw material white rice on the drying disc 204 after being leveled (the coarse leveling) by the predetermined number of the adjuster plates 252 makes contact with each of the controlling plate 254, hitting side surfaces facing the direction A and being leveled (finish leveling) by the lower edges (See FIG. 6). The controlling plate 254 is made of rubber (a urethane rubber for example) and is elastic. Thus, the controlling plate 254 can elastically deform when leveling the raw material white rice on the upper surface of the drying disc 204. It should be noted here that according to the present embodiment, the lower edge of the controlling plate 254 is generally as high as the lower edge of the predetermined number of the adjuster plates 252. Further, since the controlling plate 254 are disposed generally over the entire distance between the drying drum 200 and the cover 238, it is possible to level the raw material white rice on the drying disc 204 over its entire surface.

The upper surface of the bracket 238 supports a strip-like bracket 228 fixed thereto. The bracket 228 is disposed along the portion of the supporting member 240 on the relatively upstream side with respect to the direction A. The cover 228 is formed with a long longitudinal insertion hole 230. The insertion hole 230 is fitted by an ultrasonic sensor 232 serving as a thickness sensor. The ultrasonic sensor 232 is provided with a pair of nuts 234 fastening the bracket 228 from above and below, thereby supporting (fixing) the ultrasonic sensor 232 onto the bracket 228. By loosening the pair of nuts 234, the ultrasonic sensor 232 becomes slidable along the insertion hole 230. The ultrasonic sensor 232 is able to measure the distance to the raw material white rice on the drying disc 204 right beneath. With this arrangement, the ultrasonic sensor 232 detects the thickness of a layer of the raw material white rice near the adjuster plate 252 on the side which is upper stream side of the direction A.

A heater 216 is provided above the drying drum 200 on the upper wall of the main body 18. The heater 216 heats air from outside of the main body 18. Further, the drying disc 204 is formed with a multiplicity of vent holes 204A. A portion in the drying drum 200 below the drying disc 204 serves as an air discharging chamber 218. The drying drum 200 has an open lower end. The installation table 20 has a portion below the drying drum 200 formed with an air discharge port 220. The air discharge port 220 has a lower portion connected with an air discharging pipe 222 covering the air discharge port 220. The air discharging pipe 222 is connected with a blower (not illustrated) provided outside of the main body 18. The blower sucks the air. With this arrangement, the air heated by the heater 216 makes a warm wind, which is blown (blasted) uniformly to the raw material white rice on the drying disc 204 via the upper opening of the drying drum 200. Further, the warm wind which has passed the raw material white rice flows through the vent holes 204A, the air discharging chamber 218, the air discharge port 220 and the air discharging pipe 222, and then discharged out of the main body 18, thereby drying the raw material white rice on the drying disc 204.

An unillustrated air-conditioner (or a dehumidifier) is provided outside of the main body 18, so that the temperature and humidity of the air coming into the main body 18 can be controlled by the air-conditioner via the heater 216.

A curved stopper plate 224 is bridged between the drying drum 200 and the cover 238. A gap between a lower edge of the stopper plate 174 and the transfer plate 174 is small enough not to allow the raw material white rice to pass through. Corresponding to the stopper plates 224, the drying drum 200 is provided with a discharging gutter 226. The discharging gutter 226 provides communication between inside of the drying drum 200 and outside of the main body 18. With this arrangement, the raw material white rice fallen onto the drying disc 204 via the transfer channel 178 is turned on the drying disc 204 nearly in a full circle, and then stopped by the stopper plate 224. The raw material white rice is moved outward of the drying disc 204, and the raw material white rice which has undergone the drying process (pre-polished rice) is discharged outside of the main body 18 via the discharging gutter 226.

The discharging gutter 226 is provided with an automatic moisture meter 256 serving as detecting means. The automatic moisture meter 256 constantly or periodically detects (measures) water content in the pre-polished rice, and is connected with the control apparatus 50. The automatic moisture meter 256 is preferably a nondestructive type (i.e. a high-frequency-wave resistance type or a permittivity type is preferable).

Figure 7:
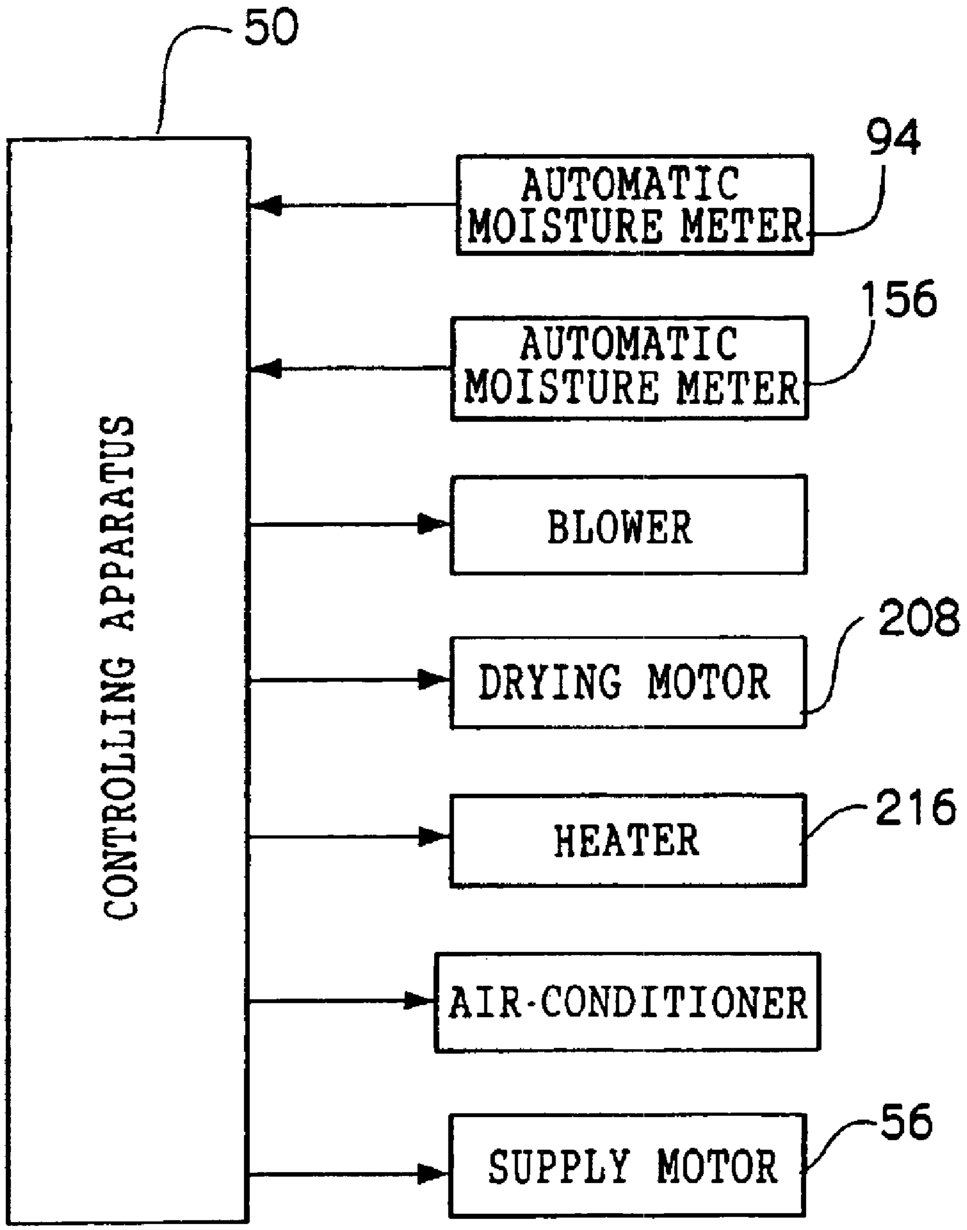
FIG. 7 is a block diagram showing connection between a control device and components such as an automatic moisture meter according to the first embodiment.

The control apparatus 50 functions as controlling means. The control apparatus 50 is connected with the supplying motor 56, the automatic moisture meter 94, the automatic moisture meter 256, the blower communicating with the air discharging pipe 222, the drying motor 208, the heater 216 and the air-conditioner (See FIG. 7.) The control apparatus 50 has a side surface on the outside surface of the main body 18, provided with a water content display panel, operation panel, a buzzer serving as a first alarming means, a so-called turning signal light serving as a second alarming means. (None of the above is illustrated in the figures.) A controlling apparatus 486 displays the water content rate of the raw material white rice detected by the automatic moisture meter 94 and the water content rate of the pre-polished rice detected by the automatic moisture meter 256, on the water content display panel, allowing to switch ON and OFF or to make adjustment to the operation of the supplying motor 56, the blower, the drying motor 208, the heater 216 and the air-conditioner based on the water content rate of the raw material white rice and of the pre-polished rice, automatically or manually (through the control panel).

Next, operation of the present embodiment will be described.

According to the pre-polished ride producing apparatus 10 having the constitution as described thus far, the rice polishing motor 38 rotates the rotating shaft 40 in the normal direction at a predetermined rotating speed (at 700 rpm for example). At the same time, the supplying motor 56 drives the screw feeder 54, supplying the raw material white rice from the hopper 58 to the lower portion of the rice polishing drum 52. The raw material white rice is transported by the grain-lifting spiral 68 upwardly through the grain-lifting chamber 70 and is supplied to the rice polishing chamber 74. At the rice polishing chamber 74, the raw material white rice is transported upward by the transporting force provided by the grain-lifting spiral 68 while being pressurized by the weight of the raw material white rice.

A water supplying tank (not illustrated) supplies, via the water-pouring holes 76A, an appropriate amount of polishing water (pure fresh water) into the rice polishing chamber 74. Then the rice polishing process is performed, in which the rotating rice polishing roll 72 agitates the raw material white rice with the polishing water in the rice polishing chamber 74. This separates and solves the impurities including aleurone residue from the surface of the raw material white rice in the polishing water.

The polishing water is poured from the water-pouring holes 76A at the top portion, and then flows down naturally. On the other hand, the raw material white rice is polished while being transported upwardly in the reverse direction with respect to the water flow. With this arrangement, at the last stage of the rice polishing process (at the upper portion of the rice polishing chamber 74), the cleaning is made by the pure fresh water from the top portion of the rice polishing section 12, while on the other hand, at the first stage of the rice polishing process (at the lower portion of the rice polishing chamber 74), the cleaning is made by the dirty water used in the last stage. In other words, purer water is used with the progress of the rice polishing process, making possible to efficiently perform the rice polishing process. As described above, since the dirty water is used in the earlier step of the rice polishing process and purer water is used with the progress of the rice polishing process, there is no need for pouring a new amount of water, and thus it is possible to produce a tasty pre-polished rice with a small amount of water.

Squeezed water discharged from the transporting pipe 162 as a result of dehydration of the raw material white rice in the dehydrating section 14 is relatively clean (quasi-clean water) because this is the water attached to the raw material white rice at the last stage (at the upper portion of the rice polishing chamber 74) of the rice polishing process, and this squeezed water can well be used as the polishing water at the first stage of the rice cleaning process without causing any deterioration in the taste of the pre-polished rice, since the bran component will not permeate into the raw material white rice. Therefore, according to the pre-polished rice producing apparatus 10 provided by the present embodiment, this squeezed water is pumped by the pump 164 into the lower portion of the rice polishing chamber 74 via the tube 86 and the water supplying pipe 84. With this arrangement, the amount of water to be pored into the rice polishing chamber 74 from the water poring ports 76A can be reduced, resulting in further water saving. It should be noted here that in another constitution differing from the present embodiment, in which the squeezed water obtained by the dehydration of the raw material white rice is released and not recycled into the rice polishing chamber, the amount of necessary polishing water is about 40 percent of the weight of the raw material white rice. On the other hand, according to the pre-polished rice producing apparatus 10 provided by the present embodiment, the amount of the polishing water is only about 10 percent to 15 percent of the weight of the raw material white rice.

The raw material white rice which has undergone the rice polishing process is discharged by the rotating sweeping plates 72B from the lower end of the discharging pipe 92 via the discharge port 52C, and then reaches the lower end of the dehydrating inner drum 104 via the rice receiving pipe 118 of the dehydrating section 14. The dirty waste water (discharge water) resulting from the rice polishing process is discharged from the lower end of the water discharging chamber 90 and the lower end of the rice polishing drum 52, and then discharged out of the main body 18 via the water receiving pipe 116, the water discharge portion 128 and the water discharging channel 182 of the dehydrating section 14.

Here, the waste water, being prevented by the raw material white rice being lifted by the grain-lifting spiral 68, does not easily flow down through the grain-lifting chamber 70. According to the present embodiment, since the water discharge ports 52B are provided at the portion where the rice polishing chamber 74 of the rice polishing drum 52 is formed, the waste water is discharged from this discharge ports 52B, and therefore is prevented from stagnating in the rice polishing chamber 74.

Further, highly dirty waste water is discharged from the water discharge port 52B at the first stage of the rice polishing process. Therefore, it becomes possible to prevent the rice bran component in the waste water from being absorbed into the raw material white rice, thereby improving the taste of the pre-polished rice.

In the dehydrating section 14, the centrifugal dehydrating drum 100 is being rotated at a predetermined speed by the dehydrating motor 134. Specifically, the dehydrating inner drum 104 is rotating at a predetermined speed (at 1200 rpm for example), whereas the dehydrating outer drum 106 is rotating at a slightly slower speed (at 1000 rpm for example). At the same time, the rotation of the dehydrating outer drum 106 causes the wind generating blades 156 to rotate to suck air from the air-intake ports 120, and the air flows through the air-blow chamber 140 and the air blowing holes 194A of the dehydrating inner drum 104, the dehydrating chamber 108 and the discharging holes 106A of the dehydrating outer drum 106, into the outer sheath drum 102.

The raw material white rice which has reached the lower end of the dehydrating inner drum 104 is centrifugally transferred to the lower portion of the dehydrating chamber 108 via the transfer port 142. The raw material white rice supplied to the dehydrating chamber 108 is centrifugally dehydrated while being lifted by the screw 144. The waste water is discharged from the discharging holes 106A of the dehydrating outer drum 106. At this time, all the waste water covering the raw material white rice is centrifugally removed while being lifted through the dehydrating chamber 108. Further, the air sucked from the air-intake ports 120 and blasted into the dehydrating chamber 108 as described earlier helps the centrifugal dehydration. The raw material white rice thus dehydrated is now covered only by a very small amount of water, and is discharged by the centrifugal force and the natural gravity, through the upper portion of the dehydrating chamber 108, the transfer plate 158, the transfer plate 174 and the transfer channel 178, onto the drying disc 204 of the drying section 16.

In the drying section 16, the drying disc 204 is rotated by the drying motor 208 at a predetermined speed (at 7 rpm for example). The raw material white rice supplied on the drying disc 204 is leveled uniformly by a predetermined number of the adjuster plates 252 and the controlling plates 254. The raw material white rice leveled on the drying disc 204 is blasted by the warm wind coming from the heater 216 through the vent holes 204A of the drying disc 204, the air discharging chamber 218, the air discharge port 220 and the air discharging pipe 222 into the main body 18, thereby completely losing the water and then dried into the pre-polished rice (i.e. processed rice). The raw material white rice thus processed into the pre-polished rice is then discharged from the discharging gutter 226, completing the ready-to-cook process of the raw material white rice.

Corresponding to the amount of supply and state (such as the amount of attached water) of the raw material white rice supplied on the drying disc 204, the vertical distance and the horizontal position of the adjuster plate 252 to the upper surface as well as the slanting angle of the adjuster plate 252, i.e. the angle with respect to the direction A of the surface away from the direction A, can be adjusted, making possible to uniformly level the raw material white rice regardless of the amount of supply or the state of the raw material white rice supplied onto the drying disc 204.

Therefore, the raw material white rice supplied on the drying disc 204 can be leveled favorably to a uniform thickness, which prevents uneven drying and poor drying efficiency of the raw material white rice, making possible to obtain the pre-polished rice of a uniform quality with little variation in water content.

Further, since the controlling plate 254 is elastic, the controlling plate 254 can level the raw material white rice while being elastically deformed. Therefore, despite a variation in the amount of supply and the state of the raw material white rice supplied to the drying disc 204 as well as a variation in the amount of supply of the raw material white rice onto the drying disc 204, the raw material white rice can be leveled further preferably.

Therefore, since the raw material white rice supplied onto the drying disc 204 is further preferably leveled to even more uniform thickness, it becomes possible to obtain the pre-polished rice of even more uniform quality with less variation in the water content.

In addition, if the thickness of the layer of the raw material white rice as detected by the ultrasonic sensor 232 exceeds a predetermined range, the control panel 50 performs at least one of the following operations. Specifically, the control panel 50 reduces the number of rotation of the supplying motor 56, thereby decreasing the amount of supply of the raw material white rice into the rice polishing drum 52, or the control panel 50 increases the number of rotation of the drying motor 208, thereby increasing the rotating speed of the drying disc 204. Thus, the thickness of the layer of the raw material white rice is decreased back in the predetermined range, preventing an overflow of the raw material white rice off the adjuster plates 252 when the adjuster plates 252 level the raw material white rice. This makes possible to always maintain a constant thickness of the layer of the raw material white rice after the leveling.

On the other hand, if the thickness of the layer of the raw material white rice as detected by the ultrasonic sensor 232 is below the predetermined range, the control panel 50 performs at least one of the following operations. Specifically, the control panel 50 increases the number of rotation of the supplying motor 56, thereby increasing the amount of supply of the raw material white rice into the rice polishing drum 52, or the control panel 50 decreases the number of rotation of the drying motor 208, thereby decreasing the rotating speed of the drying disc 204. Thus, the thickness of the layer of the raw material white rice is increased back in the predetermined range, preventing formation of a recess in the layer of the raw material white rice after the leveling by the adjuster plates 252. This makes possible to always maintain constant the thickness of the layer of the raw material white rice after the leveling.

Therefore, uneven drying of the raw material white rice is prevented, and thus quality deterioration in the pre-polished rice is prevented.

Still further, as has been described earlier, the ultrasonic sensor 232 detects the thickness of a layer of the raw material white rice near the adjuster plates 252 on the side away from the direction A. Thus, as shown in FIG. 6, the detection of the thickness is made at a ridge portion where the adjuster plates 252 hold an upper portion of the layer of the raw material white rice. This prevents a situation in which the detection is made to an irregularly undulated surface of the raw material white rice, as will be expected in such a case as the ultrasonic sensor 232 detects the thickness of the layer of the raw material white rice far away from the adjuster plates 252 on the side away from the direction A.

According to the processes as described above, a travel time for the raw material white rice is about 5 seconds in the rice polishing section 12, about 25 seconds in the dehydrating section 14, about 30 seconds in the drying section 16, requiring about 1 minute to pass through the entire processes. As understood from the above, the raw material white rice makes contact with water only for a very short time, making possible to produce the pre-polished rice of a high quality.

Now, the main body 18 supports the post 26. The post 26 has the arm 28 provided with the rice polishing section 12 (including the hopper 58, the screw feeder 54 and the rice polishing motor 38), and the rice polishing section 12 is rotated around the post 26. With this constitution, the rice polishing section 12 is detachable from the main body 18. Specifically, by simply loosening the clamp lever 34 and rotating the rice polishing section 12 around the post 26 to separate the rice polishing section 12 from the main body 18, there is provided a readily access to the connecting portion with the dehydrating section 14 of the rice polishing section 12 (for example, the lower end opening of the rice polishing drum 52, the lower end of the water discharging chamber 90 and of the discharging pipe 92) and to the connecting portion with the rice polishing section 12 of the dehydrating section 14 (for example, the outer cover 112 and the inner cover 114). With this constitution, it becomes easy to disassemble and reassemble the rice polishing section 12 and the dehydrating section 14 (and depending on parts structure of the rice polishing section 12 and the dehydrating section 14, it becomes possible to clean and wash the rice polishing section 12 and the dehydrating section 14 without disassembling and reassembling the rice polishing section 12 and the dehydrating section 14), making easy to maintain the pre-polished rice producing apparatus 10 (including cleaning, polishing as well as disassembling and reassembling of the rice polishing section 12 and the dehydrating section 14.).

Further, only the main body 18 is covered by the cover 22, the outer cover 112 and the inner cover 114, but the rice polishing section 12 is not covered. This makes the disassembling and reassembling of the rice polishing section 12 easier (making more possible to clean and wash the rice polishing section 12 without disassembling the rice polishing section 12), making easier to maintain the pre-polished rice producing apparatus 10.

Specifically, when the rice polishing section 12 is separated from the main body 18, the lower end of the rice polishing drum 52 is exposed.

With this constitution, the rotating shaft 40 (including the rice polishing roll 72 and the grain-lifting spiral 68) can be easily attached to and detached from the lower end opening of the rice polishing drum 52. With this constitution (including the supply ports 52A and the discharge ports 52C), maintenance (including the cleaning and polishing as well as repairing and replacing) of the rotating shaft 40 (including the rice polishing roll 72 and the grain-lifting spiral 68) can be performed easily and reliably.

Rice remaining in the rice polishing drum 52 can be discharged from the lower end opening of the rice polishing drum 52 by rotating the rotating shaft 40 in the reverse direction as against in the normal operation (preferably while pouring water from the water-pouring holes 76A) thereby lowering the rice down. With this constitution, the residual rice can be discharged outside of the rice polishing drum 52 without separating the rotating shaft 40 from the rice polishing drum 52.

Cleaning and washing (polishing) of the inside of the hopper 58 and of the screw feeder 54 can be performed easily by passing water, air and so on through the hopper 58, the screw feeder 54 and the rice polishing drum 52.

Still further, with the rice polishing section 12 being separated from the main body 18, the lower end opening of the water discharging chamber 90 and the lower end opening of the discharging pipe 92 are exposed. Therefore, cleaning, polishing and so on of the water discharging chamber 90 and the discharging pipe 92 can be performed easily from the lower end opening of the water discharging chamber 90 and the lower end opening of the discharging pipe 92.

On the other hand, with the rice polishing section 12 being separated from the main body 18, the upper end opening of the dehydrating section 14 and the upper end opening of the rice receiving pipe 118 are exposed. Therefore, cleaning, polishing and so on of the water receiving pipe 116 and the rice receiving pipe 118 can be performed easily from the upper end opening of the water receiving pipe 116 and the upper end opening of the rice receiving pipe 118. Further, cleaning, polishing and so on of the water discharge portion 128 to which the lower end of the water receiving pipe 116 is inserted can be performed easily from the upper end opening of the water receiving pipe 116.

Still further, with the rice polishing section 12 being separated from the main body 18, the inner cover 114 and the outer cover 112 are exposed.

Therefore, the inner cover 114 can be removed together with the water receiving pipe 116, the rice receiving pipe 118 and the windshield plate 122 only by separating the inner cover 114 from the upper wall (the outer cover 112) of the main body 18. Therefore, cleaning, polishing and so on of the water receiving pipe 116, the rice receiving pipe 118 and the water discharge portion 128 can be performed more easily, and cleaning, polishing and so on of the windshield plate 122 can be performed easily. Further, the inside of the dehydrating inner drum 104 becomes exposed by only separating the inner cover 114 from the upper wall (the outer cover 112) of the main body 18. Therefore, cleaning, polishing and so on of the inside of the dehydrating inner drum 104 (including the air blowing holes 104A and the dehydrating section 142) can be performed easily.

Further, the entire access opening 110 becomes exposed by only separating the outer cover 112 from the upper wall of the main body 18. Therefore, cleaning, polishing and so on of the transfer plate 158 and the transfer plate 174 can be performed easily. Further by separating the dehydrating inner drum 104, cleaning, polishing and so on of the inside of the dehydrating inner drum 104 (including the air blowing holes 104A and the dehydrating section 142) can be performed more easily, and cleaning, polishing and so on of the inside of the dehydrating section 144 and inside of the dehydrating outer drum 106 (including the discharging holes 106A) can be performed easily. Further, by separating not only the dehydrating inner drum 104 but also the dehydrating outer drum 106, cleaning, polishing and so on of the inside of the dehydrating outer drum 106 (including the discharging holes 106A) can be performed more easily, and in addition, cleaning, polishing and so on of the wind generating blades 156, the inside of the outer sheath drum 102 and inside of the transporting pipe 162 can be performed easily.

Now, still further, as has been described earlier, there is provided a readily access to the connecting portion with the dehydrating section 14 of the rice polishing section 12 and to the connecting portion with the rice polishing section 12 of the dehydrating section 14 by simply rotating the rice polishing section 12 with respect to the main body 18. With this constitution, proper maintenance becomes possible even if the rice polishing section 12 and the dehydrating section 14 are not sufficiently oversized. This makes possible to reduce the size of the pre-polished rice producing apparatus 10.

Further, the wire 48 of the rice polishing motor 38, the wire 60 of the supplying motor 56, the wiring 64 of the raw material sensor 62, the tube 82 for supplying the polishing water to the piping 80 from the water supply tank, the tube 86 for transporting the waste water from the pump 164 to the water supplying pipe 84, and so on are laid through the post 26. Therefore, interference by the wire 48, the wire 60, the wiring 64, the tube 82, the tube 86 and so on to the rotation of the rice polishing section 12 relative to the main body 18 can be prevented.

Further, since the main body 18 is covered by the cover 22, the outer cover 112 and the inner cover 114, safety of the pre-polished rice producing apparatus 10 can be maintained.

The lower end of the rice polishing drum 52 is open. Therefore, by rotating the rotating shaft 40 in the reverse direction as against in the normal operation (preferably while pouring water from the water-pouring holes 76A) with the entire rice polishing section 12 as attached to the main body 18, rice (the raw material white rice) remaining in the rice polishing drum 52 can be lowered by the grain-lifting spiral 68 and discharged from the lower end opening of the grain-lifting spiral 68, and the residual rice can be discharged out of the main body 18 through the water receiving pipe 116, the water discharge portion 128 and the water discharging channel 182. Therefore, the residual rice can be discharged outside of the rice polishing drum 52 without separating the rotating shaft 40 (the grain-lifting spiral 68 and the rice polishing roll 72) from the rice polishing drum 52. Thus, the maintenance operation for discharging the residual rice in the rice polishing drum 52 out of the rice polishing drum 52 no longer requires disassembling and reassembling of the rice polishing section 12 (including removal and installation of the rice polishing section 12 to and from the main body 18), making the maintenance easier.

Further, cleaning, polishing and so on of the inside of the rice polishing drum 52, the grain-lifting spiral 68 and the rice polishing roll 72 can be performed, with the rice polishing section 12 installed to the main body 18, and by passing water (the water from the water-pouring holes 76A) through the rice polishing drum 52 and discharging the water from the lower end opening of the rice polishing drum 52 and then discharging the water out of the main body 18 through the water receiving pipe 116, the water discharge portion 128 and the water discharging channel 182. Therefore, cleaning, polishing and so on of the inside of the rice polishing drum 52, the grain-lifting spiral 68 and the rice polishing roll 72 can be performed without separating the grain-lifting spiral 68 and the rice polishing roll 72 from the rice polishing drum 52. Thus, the maintenance operation such as cleaning and polishing of the inside of the rice polishing drum 52, the grain-lifting spiral 68 and the rice polishing roll 72 no longer requires disassembling and reassembling of the rice polishing section 12 (including removal and installation of the rice polishing section 12 to and from the main body 18), making the maintenance easier.

Further, cleaning, polishing and so on of the inside of the hopper 58 and the screw feeder 54 can be performed, with the rice polishing section 12 installed to the main body 18, and by passing water or air through the hopper 58, the screw feeder 54 and the rice polishing drum 52, and then discharging the water or the air out of the main body 18 through the water receiving pipe 116, the water discharge portion 128 and the water discharging channel 182. Therefore, the maintenance operation such as cleaning and polishing of the inside of the hopper 58 and the screw feeder 54 no longer requires disassembling and reassembling of the hopper 58 and the screw feeder 54 (including removal and installation of the rice polishing section 12 (including the hopper 58 and the screw feeder 54) to and from the main body 18), making the maintenance of the hopper 58 and the screw feeder 54 easy.

Now, as shown in detail in FIG. 3, in the rice polishing section 12, the gap between the screw 68A and the rice polishing drum 52 above the supply port 52A (in a region indicated by code A in FIG. 3) is small enough (for example, about 5 mm) not to crush the raw material white rice. Therefore, crushing of the raw material white rice when transporting the raw material white rice by the grain-lifting spiral 68 can be prevented. On the other hand, the gap between the screw 68A and the rice polishing drum 52 below the supply port 52A (in a region indicated by Code B in FIG. 3) is small enough (for example, about 1 mm) not to allow the raw material white rice to fall, the raw material white rice can be prevented from falling off the lower end opening of the rice polishing drum 52 during normal operation. At the same time, the dirty waste water (discharge water) resulting from the polishing of the raw material white rice at the rice polishing section 12 (inside the rice polishing drum 52) can be discharged from the lower end opening of the rice polishing drum 52.

Further, since a single row of the screw 68A is formed on the rotating shaft 40 above the supply port 52A (the region indicated by code A in FIG. 3), the raw material white rice is further prevented from being crushed during the transportation of the raw material white rice by the grain-lifting spiral 68. On the other hand, since two rows of the screw 68A are formed on the rotating shaft 40 below the supply port 52A (the region indicated by code B in FIG. 3), the raw material rice is further prevented from falling off the lower end opening of the rice polishing drum 52 during the normal operation.

According to the pre-polished rice producing apparatus 10, after the producing operation of the pre-polished rice, an operating program stored in the control panel 50 performs internal polishing for a predetermined time. In the internal polishing operation, first, the drying motor 208 in the drying section 16 is driven to rotate the drying disc 204 (the heater 216 is not operated). Thereafter, the dehydrating motor 134 and the transporting motor 168 in the dehydrating section 14 are driven to rotate the dehydrating inner drum 104, the dehydrating outer drum 106 (including the transfer plate 158), and the transfer plate 174. Further, the pump 164 is driven and the selector valve 186 closes the tube 86 and opens the branching pipe 184. Next, polishing water from the water supply tank is poured from the water supplying port 76A of the rice polishing section 12 to the upper portion of the rice polishing drum 52. Finally, the rice polishing motor 38 is driven to rotate the rotating shaft 40 in the reverse direction (the supplying motor 56 is not driven).

During the internal polishing, rice remaining in the dehydrating section 14 is transported into the drying section 16, and the rice remaining in the drying section 16 is discharged from the discharging gutter 226, thereby discharging the rice remaining in the dehydrating section 14 and in the drying section 16 from the discharging gutter 226. Further, residual water in the dehydrating section 14 is pumped by the pump 164 and discharged outside of the main body 18 via the branching pipe 184 and the water discharging channel 182. Further, polishing water from the water-pouring holes 76A washes inside of the rice polishing drum 52, the rice polishing roll 72 and the grain-lifting spiral 68, and then is discharged from the lower end opening of the rice polishing drum 52. At the same time, rice remaining in the rice polishing drum 52 is polished down by the polishing water, and then moved down by the reverse-rotating grain-lifting screw 68, and then discharged from the lower end opening of the rice polishing drum 52. Also, the polishing water and the residual rice discharged from the lower end opening of the rice polishing drum 52 is discharged out of the main body 18 via the water discharge portion 128 and the water discharging channel 182.

Further, in the predetermined time upon commencement of the internal polishing, stopping operation of the internal polishing operation is performed. In the internal polishing stopping operation, first, the rice polishing motor 38 in the rice polishing section 12 is stopped to stop the rotation of the rotating shaft 40. Thereafter, supply of the rice polishing water from the water supplying tank is stopped and pouring of the water from the water-pouring holes 76A is stopped. Next, the dehydrating motor 134 and the transporting motor 168 in the dehydrating section 14 are stopped to stop the rotation of the dehydrating inner drum 104, the dehydrating outer drum 106 (including the transfer plate 158), and the transfer plate 174. Further, the pump 164 is stopped and the selector valve 186 closes the branching pipe 184 and opens the tube 86. Finally, the drying motor 208 in the drying section 16 is stopped to stop the rotation of the drying disc 204.

According to the pre-polished rice producing apparatus 10, due to the internal polishing capability after the producing operation of the pre-polished rice, internal polishing operation of the rice polishing section 12 (polishing of the inside of the rice polishing drum 52, the grain-lifting spiral 68 and the rice polishing roll 72 and discharging of the residual rice) and internal polishing operation of the dehydrating section 14 and the drying section 16 (discharging of the residual rice and residual water) can be performed automatically. Thus, internal polishing operation of the rice polishing section 12, the dehydrating section 14 and the drying section 16 can be performed easily. Further, for this reason, the number of the maintenance services performed to the pre-polished rice producing apparatus 10 as described above can be reduced (maintenance interval can be increased).

Figure 8:
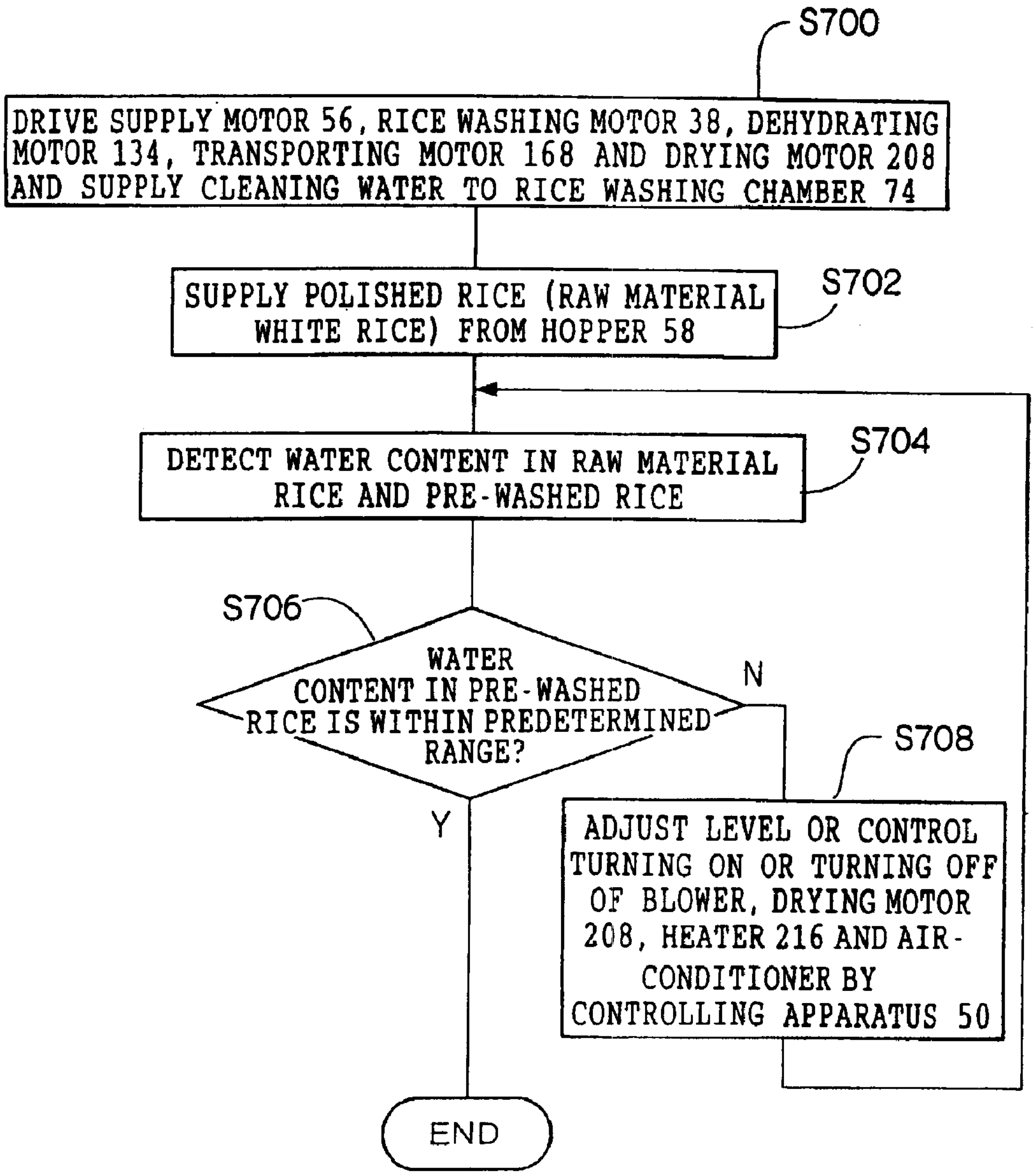
FIG. 8 is a flowchart showing an adjustment process of water content in a pre-polished rice according to the first embodiment.

Next, a process for adjusting the water content in the pre-polished rice will be described with reference to FIG. 8.

First, in step 700, the supplying motor 56, the rice polishing motor 38, the dehydrating motor 134, the transporting motor 168 and the drying motor 208 are driven, and polishing water is supplied from the water supplying tank (not illustrated) into the rice polishing chamber 74. In step 702, the raw material white rice is supplied from the hopper 58, and producing of the pre-polished rice is started in the rice polishing section 12, the dehydrating section 14 and the drying section 16. In step 704, water content of the raw material rice supplied from the hopper 58 is detected by the automatic moisture meter 94, and the water content of the pre-polished rice discharged from the discharging gutter 226 is detected by the automatic moisture meter 256, and the result of detection is displayed in the water content display panel of the controlling apparatus 50. In step 706, if the increase in the water content in the pre-polished rice with respect to the water content of the raw material white rice (normally about 14 weight percent to 15 weight percent) is within plus 0.5 weight percent, and if the water content in the pre-polished rice is within 14 weight percent to 15 weight percent, then, the water content rate adjusting process for the pre-polished rice is finished.

On the other hand, if the increase in the water content in the pre-polished rice with respect to the water content of the raw material white rice exceeds plus 0.5 weight percent, or if the water content in the pre-polished rice is not within the range of 14 weight percent to 15 weight percent, then step 708 is executed, in which the controlling apparatus 50 performs level adjustment to the blower, the drying motor 208, the heater 216 and the air-conditioner or turns ON or OFF these components, thereby making adjustment on the flow of warm wind sent to the drying chamber 206, rotating speed of the drying disc 204 (rotating speed of the polished rice), temperature and humidity of the warm wind sent to the drying chamber 206, and temperature and humidity of the air coming into the main body 18. Through these adjustments, the increase in the water content in the pre-polished rice with respect to the water content of the raw material white rice is brought within plus 0.5 weight percent, and the water content in the pre-polished rice is brought within 14 weight percent to 15 weight percent. Specifically, in step 706, if the increase in the water content in the pre-polished rice with respect to content in the raw material white rice is greater than 0.5 weight percent, and if the water content in the pre-polished rice is less than 14 weight percent, then in the step 708, such adjustments are made automatically or manually (by using the control panel) through the controlling apparatus 50 as reducing suction of the blower, decreasing the rotating speed of the drying motor 208, and decreasing the operation of the heater 216 and the air-conditioner, thereby decreasing the amount of flow of the warm wind for drying the raw material white rice in the drying section 16, increasing the amount of flow of the raw material rice, decreasing the temperature of the atmosphere, and increasing the humidity in the atmosphere, so as to increase the water content in the pre-polished rice. Likewise, in step 706, if the water content in the pre-polished rice is greater than 15 weight percent, then in the step 708, such adjustments are made automatically or manually (by using the control panel) through the controlling apparatus 50 as increasing the suction of the blower, increasing the rotating speed of the drying motor 208, and increasing the operation of the heater 216 and the air-conditioner, thereby increasing the amount of flow of the warm wind for drying the raw material white rice in the drying section 16, decreasing the amount of the raw material rice, increasing the temperature of the atmosphere, and decreasing the humidity in the atmosphere, so as to decrease the water content in the pre-polished rice.

After the controlling apparatus 50 has performed the level adjustment to the blower, the drying motor 208, the heater 216 and the air-conditioner or turned ON or OFF these components in the step 708, the procedure goes back to the step 704, in which the water contents in the raw material white rice and in the pre-polished rice are detected, and thereafter, the whole cycle of the procedure is repeated.

Therefore, the increase in the water content in the pre-polished rice with respect to the water content of the raw material white can be maintained within the plus 0.5 weight percent range, and permeation of dirty polishing water (discharged water) containing the aleurone residue into the raw material white rice during the rice polishing in the rice polishing section 12 is prevented, and thus it becomes possible to improve taste of the pre-polished rice.

Further, since the water content in the pre-polished rice can be brought within the dehydrating section 14 weight percent to 15 weight percent range, taste of the pre-polished rice can be improved by preventing the pre-polished rice from developing cracks in its surface. Further, by preventing mold growth and decomposition, preservability can be increased.

Figure 9:
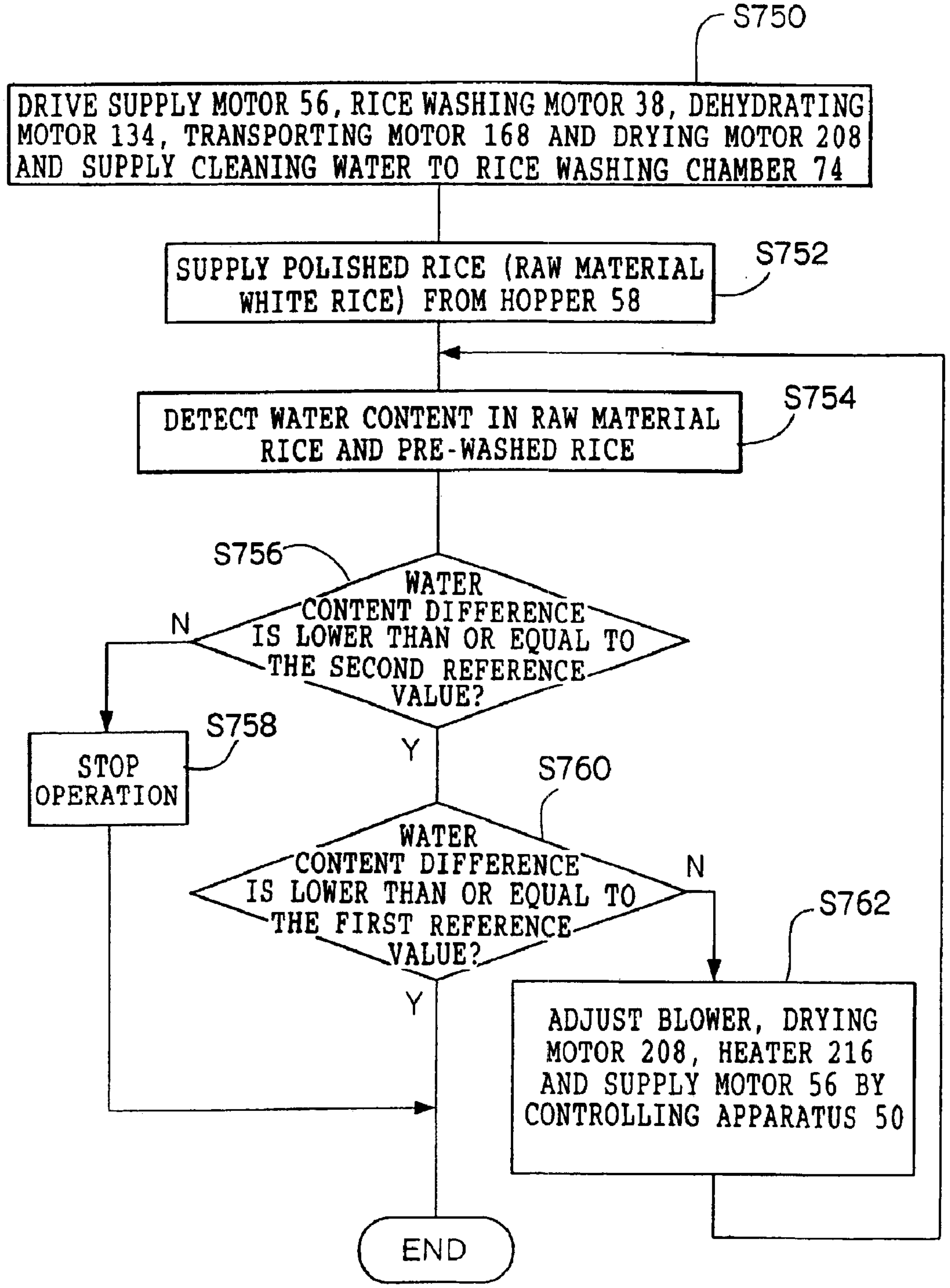
FIG. 9 is a flowchart showing an adjustment process of water content difference according to the first embodiment.

Next, a procedure for adjusting a difference in the water content (moisture difference) between the raw material rice (raw material white rice) and the processed rice (pre-polished rice) with reference to FIG. 9.

First, in step 750, the supplying motor 56, the rice polishing motor 38, the dehydrating motor 134, the transporting motor 168 and the drying motor 208 are driven. At the same time, rice polishing water (polishing water) is supplied from the water supplying tank (not illustrated) into the rice polishing chamber 74. In step 752, the raw material rice (polished rice) is supplied from the hopper 58, starting the producing of the processed rice in the rice polishing section 12, the dehydrating section 14 and the drying section 16. In step 754, the automatic moisture meter 94 constantly or periodically measures the water content rate in the raw material rice supplied from the hopper 58. At the same time, the automatic moisture meter 256 constantly or periodically measures the water content rate in the processed rice discharged from the discharging gutter 226, and the controlling apparatus 50 finds the moisture difference.

In step 756, determination is made whether or not the moisture difference is smaller than a second norm value (which is 0.5 weight percent, and is a limit value from which the controlling apparatus 50 can bring back the moisture content within the first norm as will be described later). If the moisture difference exceeds the second norm (if the water content difference between the processed rice and the raw material white rice exceeds ±0.5 weight percent), then step 758 stops the operation of the pre-polished rice producing apparatus 10.

On the other hand, if the step 756 finds that the moisture difference is smaller than a second norm value (if the water content difference between the processed rice and the raw material white rice is less than ±0.5 weight percent), then step 760 determines if the moisture difference is not greater than the first norm value (which is 0.2 weight percent, and is a limit value at which the taste of the rice is favorable).

If the step 760 finds that the moisture difference is less than the first norm value (if the water content difference between the processed rice and the raw material white rice is less than ±0.2 weight percent), then the water content difference adjustment procedure comes to an end, and operation of the pre-polished rice producing apparatus 10 is continued with the current setting.

On the other hand, if the step 760 finds that the moisture difference exceeds the first norm value (if the water content difference between the processed rice and the raw material white rice is greater than ±0.2 weight percent), then in step 762, adjustment is made by the controlling apparatus 50 on at least one of the number of rotation of the supplying motor 56 (the number of rotation of the screw feeder 54), the amount of suction of the blower, the number of rotation of the drying motor 208 (the number of rotation of the drying disc 204) and the output of the heater 216, thereby changing at least one of the amount of supply of the raw material rice to the rice polishing section 12, the amount of the warm air sent to the drying disc 204, the amount of drying time of the raw material rice in the drying section 16 and the temperature of the warm wind sent to the drying disc 204, so as to bring the moisture difference into the first norm. Specifically, if the step 760 finds that the water content difference of the processed rice from the raw material rice exceeds plus 0.2 weight percent, then in the step 762 the controlling apparatus 50 performs at least one of such adjustments as decreasing the number of rotation of the supplying motor 56, increasing the amount of suction of the blower, decreasing the number of rotation of the drying motor 208 and increasing the output of the heater 216, thereby bringing about at least one of decrease in the amount of supply of the raw material rice to the rice polishing section 12, increase in the amount of the warm air sent to the drying disc 204, increase in the amount of drying time of the raw material rice in the drying section 16 and increase in the temperature of the warm wind sent to the drying disc 204, so as to decrease the moisture difference. On the other hand, if the step 760 finds that the water content difference of the processed rice from the raw material rice exceeds minus 0.2 weight percent, then in the step 762 the controlling apparatus 50 performs at least one of such adjustments as increasing the number of rotation of the supplying motor 56, decreasing the amount of suction of the blower, increasing the number of rotation of the drying motor 208 and decreasing the output of the heater 216, thereby bringing about at least one of increase in the amount of supply of the raw material rice to the rice polishing section 12, decrease in the amount of the warm air sent to the drying disc 204, decrease in the amount of drying time of the raw material rice in the drying section 16 and decrease in the temperature of the warm wind sent to the drying disc 204, so as to decrease the moisture difference.

After the controlling apparatus 50 has made adjustment on at least one of the number of rotation of the supplying motor 56, the amount of suction of the blower, the number of rotation of the drying motor 208 and the output of the heater 216 in the step 762, the procedure goes back to the step 754, in which the water contents in the raw material rice and in the pre-polished rice are detected, and thereafter, the whole cycle of the procedure is repeated.

As has been described, the automatic moisture meter 94 makes constant or periodic measurement on the raw material rice, the automatic moisture meter 256 makes constant or periodic measurement on the processed rice, and operating status of the pre-polished rice producing apparatus 10 is determined based on the results of these measurements, maintaining the quality of the processed rice at a favorable level (the moisture difference is constantly maintained below the first norm). Therefore, it is possible to produce the high quality processed rice constantly.

Further, since the automatic moisture meter 94 and the automatic moisture meter 256 automatically measures the water content of the raw material rice and of the processed rice and since the operating status of the pre-polished rice producing apparatus 10 is automatically determined, it becomes possible to save labor of the human operator.

Further, if the moisture difference exceeds the second norm value (the limit from which the controlling apparatus 50 can bring back the moisture content within the first norm), the operation of the pre-polished rice producing apparatus 10 is stopped. Therefore, it is possible to prevent produce of low quality processed rice.

Further, if the moisture difference has exceeded the second norm value, then the buzzer in the controlling apparatus 50 is activated to alarm for the stoppage of the operation of the pre-polished rice producing apparatus 10. Therefore, the operator can recognize the stoppage of the operation.

Further, if the moisture difference becomes equal to or greater than a third norm (which is 0.4 weight percent and is a value significantly smaller than the second norm), then the flash light of the controlling apparatus 50 is activated to alarm that the moisture difference is not smaller than the third norm. Therefore, the operator can recognize that the controlling apparatus 50 may no longer able to adjust the moisture difference back to the first norm.

It should be noted here that according to the present embodiment, in the rice polishing section 12, the rotating shaft 40 has an outer circumferential wall formed with a plurality of columnar projections 72A. Alternatively however, the columnar projections may be replaced by a plurality of plate-like projections formed in parallel to the axis of rotation (center of rotation) of the rotating shaft.

Further, a rinsing water supplying port communicating with the water supplying port 76 may be formed on the outer circumference of the rotating shaft 40 where the sweeping plates 72A are formed. This allows supply of the rinsing water from the rinsing water supply port to the upper portion of the rice polishing chamber 74, and this rinsing water can be used also as polishing water.

Further, a portion of the rice polishing drum 52 surrounding a region formed with the projections 72A may be formed as a prismatic cylinder having a polygonal section (for example, hexadecagon), or a pressure-activated valve opened accordingly by a pressure exceeding a predetermined level may be provided in adjacency to the discharge port 52C. However, the raw material white rice in the rice polishing chamber 47 is under a natural and appropriate pressure provided by a transporting force acting on the raw material white rice and the weight of the raw material white rice itself (weight from the raw material white rice placed above). Therefore, it is possible to make agitation with an appropriate resistance given to the raw material white rice in the rice polishing chamber 47, even if the portion of the rice polishing drum 52 surrounding the projections 72A is not formed as a prismatic cylinder having a polygonal section (for example, hexadecagon), or a pressure-activated valve opened accordingly by a pressure exceeding a predetermined level is not formed in adjacency to the discharge port 52C.

Further, according to the present embodiment, the rice polishing section is an upright and series type. However, the constitution is not limited to the upright type rice polishing section. Specifically, the rice polishing section drum may be a transversal type in which the rice polishing drum is placed transversally, or may be a slanted type in which the rice polishing drum is placed at an angle. Further, the rice polishing section may not be limited to the series type. Specifically, the rice polishing section may have a plurality of rice polishing drums placed side by side.

Further, according to the present embodiment, rotation of the dehydrating inner drum 104 and the dehydrating outer drum 106 causes the raw material white rice supplied in the dehydrating chamber 108 to be centrifugally dehydrated while being lifted by the inner cover 114. This is not limiting however. Specifically, any constitution may be appropriate as far as the raw material white rice supplied in the dehydrating chamber is centrifugally dehydrated while being lifted or lowered by a centrifugal force or by a rotary dehydrating screw. For example, a constitution may be such that one of the dehydrating inner drum and the dehydrating outer drum is fixed and the other is rotated, thereby causing the raw material white rice supplied in the dehydrating chamber to be centrifugally dehydrated while being lifted or lowered by a rotating screw of said other of the dehydrating outer drum and the dehydrating inner drum.

Still further, according to the present embodiment, only one ultrasonic sensor 232 (thickness sensor) is provided. However, a number of ultrasonic sensors may be provided.

Still further, according to the present embodiment, the ultrasonic sensor 232 serving as the thickness sensor is capable of measuring the distance to the raw material white rice on the drying disc 204. However, the thickness sensor may be provided by a proximity switch, level switch or piezoelectric switch which turns ON and OFF when the distance to the raw material white rice on the drying disc 204 is within or out of a predetermined distance range.

Further, according to the present embodiment, the adjuster plates 252 (adjusting member) and the controlling plate 254 (controlling member) are fixed, and the raw material rice (grain) on the drying disc 204 (receiving member) is leveled by the adjuster plates 252 and the controlling plate 254 by the rotation (movement) of the drying disc 204. However, the receiving member may be fixed and the adjusting member and the controlling member may be moved, so that the grain on the receiving member is leveled by the adjusting member and the controlling member.

Further, according to the present embodiment, the leveling device according to the present invention is applied to the drying section 16 of the pre-polished rice producing apparatus 10, in order to level the rice (the raw material white rice). However, the leveling device according to the present invention may be applied to an apparatus for processing another grain than rice, in order to level such another grain than rice.

Still further, according to the present embodiment, there is provided a transversally rotating drying section 16 including the drying disc 204 which rotates in a horizontal plane. Alternatively however, the drying section may be rotating on a vertical plane as in a drying drum for example, or the drying section may be of another type.

Further, according to the pre-polished rice producing apparatus 10 provided by the present embodiment, the internal polishing after the producing operation of the pre-polished rice is performed by the operating program stored in the control panel 50. Alternatively however, the pre-polished rice producing apparatus 10 may be provided with a polishing switch, and the internal polishing may be activated by operating this switch. In this case, stoppage of the internal polishing may be made through a stopping procedure or through a timer which automatically stops the internal polishing when a set duration of time has passed.

Still further, according to the present embodiment, the automatic moisture meter 94 is provided in the hopper 58, and the automatic moisture meter 256 is provided in the discharging gutter 226, so that the water content of the raw material white rice and of the pre-polished rice is detected. Alternatively however, the automatic moisture meter (detecting means) may be provided only in the discharging gutter thereby detecting only the water content in the pre-polished rice. In this case, it becomes unable to perform the adjusting control of making the increase in the water content in the pre-polished rice with respect to the water content of the raw material white rice within plus 0.5 weight percent. However, it is still possible to perform the adjusting control of making the water content in the pre-polished rice within 14 weight percent to 15 weight percent.

Further, the controlling device (controlling means) may be connected with the rice polishing motor and the water supplying tank from which the polishing water is supplied to the rice polishing chamber. This makes it possible for the controlling device to make adjustment on transporting speed of the raw material white rice in the grain-lifting spiral, polishing speed of the raw material white rice on the rice polishing roll, or pouring amount of the polishing water into the rice polishing chamber, based on the water content rate in the raw material white rice and the pre-polished rice.

Further, the polishing water may be poured only from the water-pouring port at the head portion.

Second Embodiment

Figure 10:
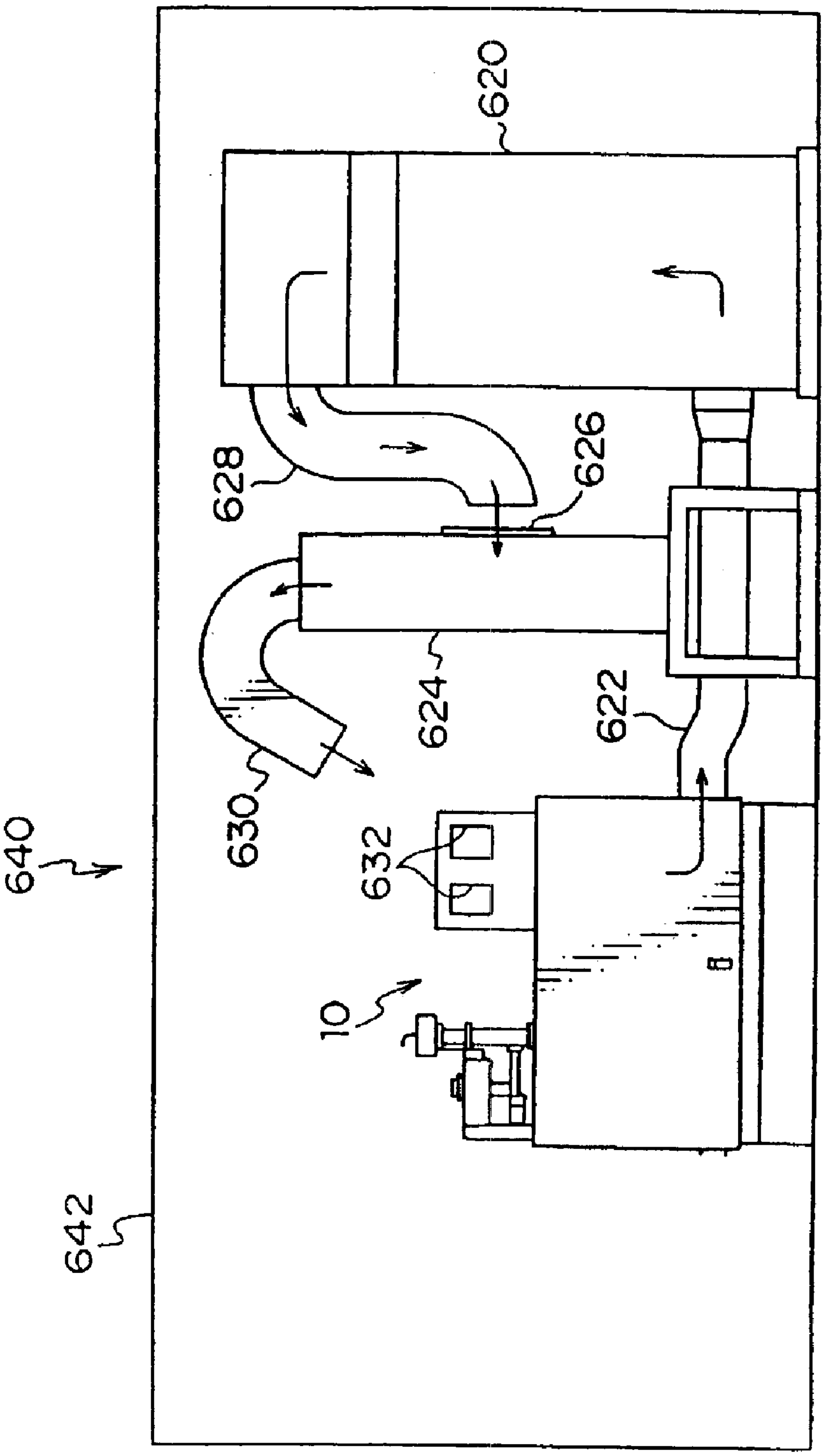
FIG. 10 is a schematic front view of a pre-polished rice producing apparatus according to a second embodiment.

FIG. 10 shows a pre-polished rice producing facility 640 according to a second embodiment of the present invention, in a simplified front view.

The pre-polished rice producing facility 640 comprises a single building 642. The building 642 as a whole is generally sealed. Within the building 642, the pre-polished rice producing apparatus 10 according to the first embodiment is installed.

The raw material white rice (pre-polished rice) discharged from the discharging gutter 226 is received by a product lifting apparatus (not illustrated) provided within the building 642.

On the other hand, the building 642 is provided with a dust remover 620. The dust remover 620 is connected to the air discharging pipe 222 of the drying section 16 of the pre-polished rice producing apparatus 10 via a duct 62, and is capable of removing fine dust and finely crushed rice present (included) in the discharged air (warm wind) discharged from the drying section 16.

Further, the building 642 is provided with a dehumidifying drier 624. The dehumidifying drier 624 has an air sucking port 626 faced by a discharging duct 628 of the dust remover 620. Therefore, the discharged air (ward wind) after the removal of the dust is supplied to the dehumidifying drier 624.

Further, the dehumidifying drier 624 has an air discharging duct 630 faced by an air intake port 632 in the drying section 16 (i.e. the air intake port to the heater 216). Therefore, discharged air (dry warm wind) after the; dehumidification and drying by the dehumidifying drier 624 is supplied to the drying section 16 of the pre-polished rice producing apparatus 10.

The pre-polished rice producing apparatus 10, the dust remover 620 and the dehumidifying drier 624 arranged as described above are operated by an operation panel (not illustrated) provided within the building 642. Further, when producing the pre-polished rice, the pre-polished rice producing apparatus 10, the dust remover 620 and the dehumidifying drier 624 are operated from the control panel.

According to the pre-polished rice producing facility 640, the pre-polished rice producing apparatus 10, the dust remover 620 and the dehumidifying drier 624 are installed in a single building 642. Further, within the building 642, the discharged air (warm wind) discharged from the drying section 16 of the pre-polished rice producing apparatus 10 is supplied to the dust remover 620, where the dust is removed, the discharged air (warm wind) after the dust removal by the dust remover 620 is then supplied to the dehumidifying drier 624, where dehumidification and drying is performed, and then the discharged air (dry warm wind) after the dehumidification and drying is supplied to the drying section 16 of the pre-polished rice producing apparatus 10. Specifically, the dry warm wind generated (heated by the heater 16) in the drying section 16 of the pre-polished rice producing apparatus 10 is re-circulated for recycled use. An arrow in FIG. 10 indicates a flow of the re-circulated wind.

Therefore, ambient atmospheric conditions (temperature and humidity) can be maintained within a constant range in the operation of the pre-polished rice producing apparatus 10. Further, there is no need for a special air-conditioning facility, eliminating a major expense for the air conditioning purpose. Further, this makes possible to decrease the level of output of the heater 216 in the drying section 16 of the pre-polished rice producing apparatus 10, resulting in efficiency and energy saving.

As has been described so far, according to the pre-polished rice producing facility 640 provided by the present embodiment, the ambient atmospheric conditions (temperature and humidity) can be maintained within a constant range, and therefore it is possible to produce the pre-polished rice of a high quality. In addition, there is no need for a major expense in facility and equipment, leading to energy saving.

According to a rice polisher provided by the first aspect of the present invention, dirty water is used in the earlier step of the rice polishing process and purer water is used with the progress of the rice polishing process. Therefore, there is no need for pouring a new amount of rinsing water, and thus it becomes possible to produce a tasty pre-polished rice with a small amount of water.

According to a rice polisher provided by the second aspect of the present invention, highly dirty wastewater is discharged at the first stage of the rice polishing process. Therefore, it becomes possible to prevent the rice bran component in the waste water from being absorbed into the raw material white rice, to decrease dirtiness of the waste water, and thus to perform the preprocess necessary for producing the pre-polished rice having a favorable taste.

According to a pre-polished rice producing apparatus provided by the third aspect of the present invention, the polished rice that is preprocessed by a rice polisher capable of performing the preprocess necessary for producing the pre-polished rice having a favorable taste is dehydrated and dried. Therefore, it becomes possible to produce a tasty pre-polished rice with a small amount of water.

According to a pre-polished rice producing apparatus provided by the fourth aspect of the present invention, squeezed water obtained from dehydration of the polished rice in the dehydrating section is the water that attached to the polished rice at the last stage of the rice polishing process, and therefore relatively clean (quasi-clean water).

Thus, even if this squeezed water is reused as the polishing water at the first stage of the rice cleaning process, the bran component will not permeate into the polished rice, and so there is no chance for deterioration of the taste of the pre-polished rice. Therefore, by supplying this squeezed water into the lower portion of the rice polishing chamber, the amount of water to be pored from the water-pouring ports into the rice polishing chamber can be reduced, resulting in further water saving.

According to a pre-polished rice producing apparatus provided by the fifth aspect or the sixth aspect of the present invention, the water content increase in the pre-polished rice as compared to the water content of the raw material white rice (normally around 14 weight percent to 15 weight percent) can be made within plus 0.5 weight percent, and the rice bran component in the waste water can be prevented from being absorbed into the raw material white rice. Therefore, taste of the pre-polished rice can be improved.

Further, since the water content in the pre-polished rice can be brought within the dehydrating section 14 weight percent to 15 weight percent range, taste of the pre-polished rice can be improved by preventing the pre-polished rice from developing cracks in its surface. Further, by preventing mold growth and decomposition, preservability can be increased.

According to a pre-polished rice producing apparatus provided by the seventh aspect of the present invention, the detecting mans measures the water content in the raw material white rice and in the pre-polished rice constantly or periodically, and operating status of the pre-polished rice producing device is determined based on the results of these measurements, maintaining the quality of the processed rice at a favorable level. Therefore, it is possible to produce a high quality processed rice constantly.

Further, since the detecting means automatically measures the water content of the raw material rice and of the pre-polished rice, and since the operating status of the pre-polished rice producing apparatus is automatically determined, it becomes possible to save labor of a human operator.

According to a pre-polished rice producing apparatus provided by the eighth aspect of the present invention, if the moisture difference obtained through the measurement by the detecting means exceeds the second norm, then the operation is stopped. Therefore it is possible to prevent produce of the pre-polished rice of a low quality.

According to a pre-polished rice producing apparatus provided by the ninth aspect of the present invention, by simply rotating the rice polishing section thereby separating the rice polishing section from the apparatus main body, there is provide a readily access to the connecting portion of the rice polishing section with the dehydrating section, and the connecting portion of the dehydrating section with the rice polishing section. Therefore, maintenance of the pre-washed rice producing device can be made easy. Further, with this constitution, proper maintenance of the rice polishing section and the dehydrating section becomes possible even if the rice polishing section and the dehydrating section are not sufficiently oversized. This makes possible to reduce the size of the pre-polished rice producing apparatus.

According to a pre-polished rice producing apparatus provided by the tenth aspect of the present invention, since the rice polishing drum has an open lower end, rice remaining in the rice polishing drum can be discharged from the lower end opening of the rice polishing drum by rotating the rotating shaft in the reverse direction as against in the normal operation. With this constitution, there no longer is need for disassembling and reassembling of the rice polishing section at the time of the maintenance operation when the residual rice in the rice polishing drum is discharged outside of the rice polishing drum, and therefore the maintenance can become easier.

Further, cleaning, polishing and so on of the inside of the rice polishing drum, the grain-lifting spiral and the rice polishing roll can be performed easily by passing water through the rice polishing drum and then allowing the water to discharge from the lower end opening of the rice polishing drum. Thus, there no longer is need for disassembling and reassembling of the rice polishing section at the time of the maintenance operation when cleaning, polishing and so on of the rice polishing drum, grain-lifting spiral and the rice polishing roll is performed, and therefore the maintenance can become even easier.

Further, since the grain-lifting spiral and the rice polishing roll can be easily attached and detached from the lower end opening of the rice polishing drum, maintenance of the inside of the rice polishing drum, the grain-lifting spiral and the rice polishing roll can be performed easily.

Still further, the gap between the screw and the rice polishing drum above the supply port is a gap which does not produce crushed pieces of the raw material white rice. Therefore, crushing of the raw material white rice when transporting the raw material white rice by the grain-lifting spiral can be prevented. On the other hand, the gap between the screw and the grain-lifting screw below the supply port a gap which does not allow the raw material white rice to fall. Therefore, the raw material white rice can be prevented from falling off the lower end opening of the rice polishing drum during normal operation. At the same time, the dirty waste water resulting from the polishing of the raw material white rice can be discharged from the lower end opening of the rice polishing drum.

According to a pre-polished rice producing apparatus provided by the eleventh aspect of the present invention, a single row of the screw is formed on the rotating shaft above the supply port. Therefore, the raw material white rice is further prevented from being crushed during the transportation of the raw material white rice by the grain-lifting spiral. On the other hand, two rows of the screw are formed on the rotating shaft below the supply port. Therefore, the raw material rice is further prevented from falling off the lower end opening of the rice polishing drum during the normal operation.

According to a pre-polished rice producing apparatus provided by the twelfth aspect of the present invention, the internal polishing of the rice polishing section is performed by rotating the rotating shaft in the reverse direction while rice polishing water is being supplied from the water-pouring ports. Thus, the internal polishing operation of the rice polishing section including the discharging operation of the residual rice can be automated, and therefore the maintenance of the rice polishing section can be easier.

Still further, the gap between the rice polishing screw and the rice polishing drum below the supply port is small enough not to allow the raw material white rice to fall. Therefore, the raw material white rice can be prevented from falling off the lower end opening of the rice polishing drum during the normal operation. At the same time, the dirty waste water resulting from the polishing of the raw material white rice at the rice polishing section can be discharged from the lower end opening of the rice polishing drum.

According to a pre-polished rice producing apparatus provided by the thirteenth aspect of the present invention, if the thickness of the layer of the raw material white rice detected by the thickness sensor is thicker than a predetermined range, at least one of the volume reduction adjustment of the amount of the raw material rice from the supplying mechanism and the speed increase adjustment of the rotating speed of the drying disc is performed. This makes possible to always maintain a constant thickness of the raw material white rice after the leveling. Therefore, uneven drying of the raw material white rice is prevented, and quality deterioration in the pre-polished rice is prevented.

According to a pre-polished rice producing apparatus provided by the fourteenth aspect of the present invention, if the thickness of the layer of the raw material white rice detected by the thickness sensor is thinner than a predetermined range, at least one of the volume increase adjustment of the amount of the raw material rice from the supplying mechanism and the speed reduction adjustment of the rotating speed of the drying disc is performed. This makes possible to always maintain a constant thickness of the raw material white rice after the leveling. Therefore, uneven drying of the raw material white rice is prevented, and quality deterioration in the pre-polished rice is prevented.

According to a pre-polished rice producing apparatus provided by the fifteenth aspect of the present invention, the thickness sensor detects the thickness of the layer of the raw material white rice near the leveling member on the drying disc. Therefore, a relatively stable measurement of the thickness of the layer of the raw material white rice is possible.

According to a leveling device provided by the sixteenth aspect of the present invention, vertical and the horizontal position of the adjusting member relative to the receiving surface as well as slanting angle of the surface away from a predetermined direction with respect to the predetermined direction can be adjusted correspondingly to the kind, amount of supply, state and so on of the grain supplied on the receiving surface. Therefore, it becomes possible to favorably level the grain regardless of the kind, the amount of supply or the state of grain supplied onto the receiving surface.

According to a leveling device provided by the seventeenth aspect of the present invention, the controlling member is elastic. Therefore, despite variation in the amount of supply and the state of the grain supplied to the receiving surface as well as variation in the amount of grain supply during the operation of the leveling device, the grain can be leveled further preferably.

According to a pre-polished rice producing facility provided by the eighteenth aspect of the present invention, environmental conditions (temperature and humidity) in the atmosphere (ambient air) can be maintained within a constant range, and therefore it is possible to produce the pre-polished rice uniform and high in quality. In addition, there is no need for a major expense in facility and equipment, leading to remarkable effect of energy saving.

According to rice polishers provided by the nineteenth through the twenty-first aspects of the present invention, the same effects as in the embodiment described above can be obtained.

According to pre-polished rice producing apparatuses provided by the twenty-second and the twenty-third aspects of the present invention, the same effects as in the embodiment described above can be obtained.

What is claimed is:

1. A pre-polished rice producing apparatus, the apparatus comprising:

a rice washing section, the rice washing section including a supplying mechanism for supplying raw material white rice and washing rice by agitating with washing water the raw material white rice supplied by the supplying mechanism; and an apparatus main body, the apparatus main body housing therein a dehydrating section, the dehydrating section connected to the rice washing section and being for dehydrating the raw material white rice supplied from the rice washing section, and housing therein a drying section, the drying section connected to the dehydrating section and being for drying the raw material white rice supplied from the dehydrating section;

wherein the dehydrating section is provided just below the washing section, and the rice washing section is disposed on a supporting shaft supported by the apparatus main body such that the rice washing section is pivotable around the supporting shaft, thereby being attachable to and detachable from the apparatus main body.

2. A pre-polished rice producing apparatus, the apparatus comprising:

a rice washing section, the rice washing section including a supplying mechanism for supplying raw material white rice and washing rice by agitating with washing water the raw material white rice supplied by the supplying mechanism; and an apparatus main body, the apparatus main body housing therein a dehydrating section, the dehydrating section connected to the rice washing section and being for dehydrating the raw material white rice supplied from the rice washing section, and housing therein a drying section, the drying section connected to the dehydrating section and being for drying the raw material white rice supplied from the dehydrating section;

wherein the dehydrating section is provided just below the washing section, and the rice washing section is disposed on a supporting shaft supported by the apparatus main body such that the rice washing section is pivotable around the supporting shaft, thereby being attachable to and detachable from the apparatus main body by the rice washing section being rotated around the supporting shaft, and the rice washing section is disposed on the supporting shaft via a connecting section.

* * * * *